(12) United States Patent
Momoi et al.

(10) Patent No.: US 8,650,729 B2
(45) Date of Patent: Feb. 18, 2014

(54) BLADE POSITION REGISTERING APPARATUS

(71) Applicant: Yamazaki Mazak Corporation, Aichi Pref. (JP)

(72) Inventors: Shoji Momoi, Aichi Pref. (JP);
Toshihito Okuda, Aichi Pref. (JP);
Hiromasa Yamamoto, Aichi Pref. (JP)

(73) Assignee: Yamazaki Mazak Corporation, Aichi Pref. (JP)

( * ) Notice: Subject to any disclaimer, the term of this patent is extended or adjusted under 35 U.S.C. 154(b) by 0 days.

(21) Appl. No.: 13/689,475

(22) Filed: Nov. 29, 2012

(65) Prior Publication Data
US 2013/0087025 A1 Apr. 11, 2013

Related U.S. Application Data

(62) Division of application No. 12/121,115, filed on May 15, 2008.

(30) Foreign Application Priority Data

May 16, 2007 (JP) ................. 2007-130992

(51) Int. Cl.
*B23B 27/00* (2006.01)
*B23B 49/00* (2006.01)

(52) U.S. Cl.
USPC .............. 29/27 C; 33/628; 29/27 R; 483/18

(58) Field of Classification Search
USPC ........... 483/18; 29/27 R, 27 C; 700/175, 176, 700/180; 33/628, 503, 558, 561, 546, 555, 33/567, 567.1
See application file for complete search history.

(56) References Cited

U.S. PATENT DOCUMENTS

| | | | |
|---|---|---|---|
| 2,877,676 A | 3/1959 | Swanson | |
| 3,010,344 A | 11/1961 | Martin | |
| 3,402,625 A | 9/1968 | Sweeny | |
| 3,408,885 A | 11/1968 | Mendenhall | |
| 3,746,845 A * | 7/1973 | Henegar et al. | 700/189 |
| 3,795,054 A * | 3/1974 | Kinney | 33/505 |
| 3,822,620 A | 7/1974 | Willen | |
| 4,129,220 A | 12/1978 | Peterson et al. | |

(Continued)

FOREIGN PATENT DOCUMENTS

| | | |
|---|---|---|
| DE | 2740873 | 3/1979 |
| DE | 19639976 | 4/1998 |

(Continued)

OTHER PUBLICATIONS

Second Office Action (includes English translation) for Chinese Application No. 200810098825.6, dated Dec. 17, 2010.

(Continued)

*Primary Examiner* — David Bryant
*Assistant Examiner* — Jason L Vaughan
(74) *Attorney, Agent, or Firm* — Sheridan Ross P.C.

(57) ABSTRACT

A carriage is moved in a direction including a Y axis component in order to move a turning process tool that is attached to a tool spindle along a horizontal line that is perpendicular to a Z axis, and thus, a turning process is carried out on a workpiece which is attached to a workpiece spindle.

4 Claims, 15 Drawing Sheets

(56) References Cited

U.S. PATENT DOCUMENTS

| | | | |
|---|---|---|---|
| 4,523,450 A * | 6/1985 | Herzog | 73/1.81 |
| 4,550,375 A | 10/1985 | Sato et al. | |
| 4,635,329 A * | 1/1987 | Holy et al. | 29/27 C |
| 4,694,401 A | 9/1987 | Higuichi | |
| 4,766,703 A | 8/1988 | Rattazzini | |
| 4,785,525 A | 11/1988 | Ishida et al. | |
| 4,795,293 A | 1/1989 | Mizoguchi | |
| 4,821,201 A | 4/1989 | Kawamura | |
| 4,833,617 A | 5/1989 | Wang | |
| 4,888,707 A | 12/1989 | Shimada | |
| 4,908,746 A | 3/1990 | Vaughn | |
| 5,090,280 A | 2/1992 | Kosker | |
| 5,108,117 A | 4/1992 | Crossman et al. | |
| 5,205,806 A | 4/1993 | Ishida et al. | |
| 5,214,829 A | 6/1993 | Minagawa | |
| 5,289,622 A * | 3/1994 | Minagawa | 29/27 R |
| 5,315,523 A | 5/1994 | Fujita et al. | |
| 5,370,023 A | 12/1994 | Morgan et al. | |
| 5,604,914 A | 2/1997 | Kabe | |
| 5,610,842 A | 3/1997 | Seki et al. | |
| 5,715,068 A | 2/1998 | Izor et al. | |
| 5,745,387 A | 4/1998 | Corby, Jr. et al. | |
| 5,798,928 A * | 8/1998 | Niwa | 700/180 |
| 5,808,432 A | 9/1998 | Inoue et al. | |
| 5,933,353 A * | 8/1999 | Abriam et al. | 700/182 |
| 5,964,016 A * | 10/1999 | Ito et al. | 29/27 C |
| 5,994,863 A | 11/1999 | Fujita | |
| 5,999,708 A | 12/1999 | Kajita | |
| 6,003,257 A | 12/1999 | Stokes | |
| 6,073,323 A * | 6/2000 | Matsumoto | 29/27 C |
| 6,178,856 B1 | 1/2001 | Caddaya et al. | |
| 6,185,818 B1 | 2/2001 | Ito et al. | |
| 6,205,372 B1 * | 3/2001 | Pugh et al. | 700/193 |
| 6,219,583 B1 | 4/2001 | Kinoshita et al. | |
| 6,246,920 B1 | 6/2001 | Mizuno et al. | |
| 6,279,438 B1 | 8/2001 | Delacou | |
| 6,292,712 B1 | 9/2001 | Bullen | |
| 6,400,998 B1 | 6/2002 | Yamazaki et al. | |
| 6,741,451 B2 | 10/2002 | Kojima et al. | |
| 6,523,193 B2 | 2/2003 | Saraya | |
| 6,568,096 B1 | 5/2003 | Svitkin et al. | |
| 6,609,038 B1 | 8/2003 | Croswell et al. | |
| 6,626,075 B2 | 9/2003 | Hirose et al. | |
| 6,651,019 B2 | 11/2003 | Mizuguchi et al. | |
| 6,671,571 B1 | 12/2003 | Matsumiya et al. | |
| 6,741,905 B1 | 5/2004 | Fishman et al. | |
| 6,751,523 B2 | 6/2004 | Nakamura | |
| 6,758,640 B2 * | 7/2004 | Mizutani et al. | 409/131 |
| 6,804,575 B2 | 10/2004 | Sagawa et al. | |
| 6,810,600 B1 * | 11/2004 | Horwarth et al. | 33/645 |
| 6,850,814 B2 | 2/2005 | Kamiya | |
| 6,856,853 B2 | 2/2005 | Takahashi | |
| 6,907,312 B2 * | 6/2005 | Sagawa et al. | 700/180 |
| 6,915,181 B2 * | 7/2005 | Shinozaki et al. | 700/169 |
| 6,972,389 B2 | 12/2005 | Ogata et al. | |
| 7,056,072 B2 * | 6/2006 | Mizutani et al. | 409/131 |
| 7,062,352 B2 | 6/2006 | Hasebe et al. | |
| 7,155,303 B2 | 12/2006 | Sagasaki et al. | |
| 7,174,284 B2 | 2/2007 | Dolansky et al. | |
| 7,194,396 B2 | 3/2007 | Watanabe et al. | |
| 7,506,423 B2 * | 3/2009 | Iwabuchi et al. | 29/27 C |

| | | | |
|---|---|---|---|
| 2002/0004688 A1 | 1/2002 | Kojima et al. | |
| 2002/0045968 A1 | 4/2002 | Nakamura | |
| 2002/0129681 A1 | 9/2002 | Ono | |
| 2002/0133264 A1 | 9/2002 | Maiteh et al. | |
| 2002/0189120 A1 | 12/2002 | Kaneda et al. | |
| 2002/0193906 A1 | 12/2002 | Sugiyama et al. | |
| 2002/0193972 A1 | 12/2002 | Kudo et al. | |
| 2003/0014322 A1 | 1/2003 | Kreidler et al. | |
| 2003/0014387 A1 | 1/2003 | Kreidler et al. | |
| 2003/0014498 A1 | 1/2003 | Kreidler et al. | |
| 2003/0023336 A1 | 1/2003 | Kreidler et al. | |
| 2003/0033048 A1 | 2/2003 | Nakamura et al. | |
| 2003/0045947 A1 | 3/2003 | Wampler | |
| 2003/0090490 A1 | 5/2003 | Watanabe et al. | |
| 2003/0090491 A1 | 5/2003 | Watanabe et al. | |
| 2003/0171841 A1 | 9/2003 | Porter et al. | |
| 2003/0171842 A1 | 9/2003 | Teramoto et al. | |
| 2004/0107018 A1 | 6/2004 | Nakamura | |
| 2004/0225405 A1 | 11/2004 | Takahashi | |
| 2005/0090929 A1 | 4/2005 | Dolansky et al. | |
| 2005/0143854 A1 * | 6/2005 | Shinozaki et al. | 700/180 |
| 2006/0106616 A1 | 5/2006 | Ohashi et al. | |
| 2006/0259181 A1 | 11/2006 | Kamiya et al. | |
| 2007/0050079 A1 | 3/2007 | Itoh et al. | |
| 2008/0282854 A1 | 11/2008 | Momoi et al. | |
| 2010/0063608 A1 * | 3/2010 | Miller | 700/97 |

FOREIGN PATENT DOCUMENTS

| | | |
|---|---|---|
| EP | 0061839 | 10/1982 |
| EP | 0083836 | 7/1983 |
| EP | 0241070 | 10/1987 |
| EP | 0250597 | 1/1988 |
| EP | 0354393 | 2/1990 |
| EP | 0530032 | 3/1993 |
| EP | 0597127 | 5/1994 |
| JP | 62044351 | 2/1987 |
| JP | 62292351 | 12/1987 |
| JP | 1133867 | 5/1989 |
| JP | 1222843 | 9/1989 |
| JP | H03-86407 | 4/1991 |
| JP | 3151655 | 6/1991 |
| JP | 05-138402 | 6/1993 |
| JP | 7223148 | 8/1995 |
| JP | 11-216641 | 8/1999 |
| JP | 11338527 | 12/1999 |
| JP | 2000-254802 | 9/2000 |
| JP | 2001-030143 | 2/2001 |
| JP | 2001-300801 | 10/2001 |
| JP | 2002-096804 | 4/2002 |
| JP | 2002-224936 | 8/2002 |
| JP | 2005-019829 | 1/2005 |
| WO | WO 96/06703 | 3/1996 |

OTHER PUBLICATIONS

Official Action for Japan Patent Application No. 2007-130992, dated Nov. 1, 2011, 2 pages.

Notice of Allowance for Japan Patent Application No. 2007-130992, dated Mar. 6, 2012.

Official Action for U.S. Appl. No. 12/121,115 mailed on Nov. 7, 2012, 9 pages.

* cited by examiner

● Cutting point in accordance with conventional process method
○ Cutting point in horizontal turning process

Fig.19

| Name of Tool | Type of Tool | |
|---|---|---|
| TOOL-A | For Turning in X-Z Plane | ←171 |
| TOOL-B | For Turning in X-Z Plane | |
| TOOL-C | For Horizontal Turning | |
|  |  | |

Fig.20(A)

Tool for turning in X-Z plane ←173

| Name of Tool | Z Axis Offset | X Axis Offset |
|---|---|---|
| TOOL-A |  |  |
| TOOL-B |  |  |
|  |  |  |

Fig.20(B)

Tool for horizontal turning ←172

| Name of Tool | First Tool Length | Second Tool Length | Third Tool Length |
|---|---|---|---|
| TOOL-C |  |  |  |
|  |  |  |  |
|  |  |  |  |

BLADE POSITION REGISTERING APPARATUS

This application is a divisional of pending U.S. patent application Ser. No. 12/121,115, filed May 15, 2008, which claims the benefit of Japanese Patent Application No. 2007-130992, filed May 16, 2007, the entire disclosures of which are incorporated by reference herein.

BACKGROUND OF THE INVENTION

The present invention relates to a method for controlling a combined lathe apparatus, a combined lathe apparatus, a turning tool holder, a blade position registering apparatus, and a blade position detecting apparatus.

The basic design concepts for combined lathe apparatuses include the following 1) to 3).

These are the most important points which should be taken into consideration at the time of design.

1) The operator can come close to a workpiece and the tool headstock, which is easy to use.

2) The space for installing the machine tool within a factory is small.

3) Chips can be smoothly discharged and the chips are easy to be processed.

Thus, as shown in FIGS. 12(A) to 12(C), apparatuses having a moveable body 420, which is inclined by a predetermined angle θ relative to the horizontal line, have been used as a combined lathe apparatus having an automatic tool replacing apparatus. In general, the predetermined angle θ is 45°, 60°, or 90°. The moveable body 420 is placed above a bed 410 and a tool headstock 400 which is moveable along the X axis is provided on the moveable body 420. In the example in FIG. 12(A), the moveable body 420 moves along the horizontal line Yt and the tool headstock 400 moves along the X axis which makes a predetermined angle θ with respect to the horizontal line Yt. The horizontal line Yt is a straight line included in the horizontal plane and the X-Y plane.

In the example in FIG. 12(B), the moveable body 420 moves along the Y axis and the tool headstock 400 moves along the X axis which makes the predetermined angle θ with respect to the horizontal line Yt. In the example in FIG. 12(C), the moveable body 420 moves along the Y axis (horizontal line Yt) and the tool headstock 400 moves along the X axis which is perpendicular to the horizontal line Yt.

In this type of combined lathe apparatuses, a workpiece is cut at a predetermined angle θ, and thus a turning process is carried out on the workpiece. In the combined processing lathe disclosed in Japanese Laid-Open Patent Publication No. 2000-254802, for example, a tool which is placed in the direction perpendicular to the axis of the workpiece spindle is used to process the workpiece in order to avoid the effects of the thermal displacement of the workpiece spindle.

In the case where a turning process is carried out on the outer peripheral surface of a workpiece in the above described combined lathe apparatus having automatic tool replacing means, a problem arises that bending of the workpiece due to its own weight directly affects the process precision (cylindricity). In general, the amount of bending δ (mm) in a supported workpiece can be calculated in Formula (1).

$$\delta = (5 \cdot P \cdot L^3)/(384 \cdot E \cdot I) \tag{1}$$

P is the weight of the workpiece (N), L is the length of the workpiece (mm), E is a modulus of direct elasticity (N/mm$^2$), and I is the second moment of area (mm$^4$). Formula (1) includes the cubed length L of the workpiece. Therefore the length L of the workpiece is very dominant over the amount of bending δ. Thus, the greater the length L of the workpiece is, the greater the amount of bending δ due to the weight of the workpiece becomes. Accordingly, when a turning process is carried out at a predetermined angle θ relative to the horizontal line Yt, it is subjected to the effects of the workpiece bending, and therefore the precision of processing the workpiece becomes poor (hereinafter this problem is referred to as first problem).

In terms of the general structure of the bed, the thickness in the vertical direction is small and the length in the lateral direction is great for the ease of use. In the case of a machine tool, the jack bolt is adjusted so that the machine tool is positioned. However, the location of the base changes and the load applied to the jack bolt also changes because of the occurrence of an earthquake, a change in the state of the base made of concrete on which the machine tool is installed and the like. Therefore the degree of bending in the vertical direction of the bed which is thin and has a low rigidity is easy to change in machine tools.

A change in the degree of bending in the vertical direction means the same as a change in pitching as shown in FIG. 15. Pitching means a deviation in the angle when the tool headstock moves along the axis of the workpiece spindle. The amount of bending δ is due to the workpiece W bending in the case where the error on the machine side is "0", and the pitching is due to an error in the machine.

This error affects the position of the blade in the vertical direction and at the same time affects the precision of processing the workpiece W (hereinafter this problem is referred to as second problem). In the case where this problem is addressed by readjusting the jack bolt, a great amount of time and effort are required for the adjustment. In addition to this, it is difficult to determine whether or not the change in the state of the base has lowered the precision.

Furthermore, a rotating tool, a turning processing tool and the like are attached to the tool headstock in accordance with contents of processing. A motor for rotating the rotating tool, a bearing for supporting an object to be rotated and the like are incorporated in the tool headstock. In this case, the motor and the bearing are the heat source which causes a thermal displacement in the tool headstock. The thermal displacement is easily caused along the axis of the spindle of the tool. As shown in FIG. 14, the direction of the axis of the spindle of the tool coincides with the direction of cutting in which the workpiece is processed using a turning processing tool. That is to say, the turning processing tool is subjected to the effects of the thermal displacement in the tool headstock even after the rotating tool is replaced with the turning processing tool. In FIG. 14, Wa indicates the outer diameter of the workpiece W on which a cutting process has been carried out in such a state as to be subjected to thermal displacement. In FIG. 14, q indicates the length gained by subtracting the outer diameter Wa of the workpiece W on which a cutting process has been carried out in such a state as to be subjected to thermal displacement from the outer diameter of the workpiece W on which a cutting process has been carried out in such a state as not to be subjected to thermal displacement.

Accordingly, thermal displacement in the turning processing tool affects the precision of processing in an outer diameter turning process and the outer diameter of the workpiece W after processing (hereinafter this problem is referred to as third problem). A technology for allowing a machine to correct the amount of thermal displacement has been proposed. In accordance with this technology, however, no fundamental measure is taken against the problem and therefore it is difficult to stably carry out a turning process with high precision.

The combined processing lathe disclosed in Japanese Laid-Open Patent Publication No. 2000-254802 does not have an automatic tool replacing apparatus where a rotating tool and a turning processing tool can be replaced. Therefore, the first to third problems with combined process lathing apparatuses having an automatic tool replacing apparatus to which the present invention relates cannot be solved at the same time.

SUMMARY OF THE INVENTION

An objective of the present invention is to provide a method for controlling a combined lathe apparatus having automatic tool replacing means, which method suppresses the effects of a workpiece bending due to its own weight, the effects of pitching due to a change in the manner in which the bed having a low rigidity bends in the vertical direction, and the effects of thermal displacement due to heat from a motor and bearings for rotating a rotating tool.

Another object of the present invention is to provide a combined lathe apparatus having automatic tool replacing means, which apparatus suppresses the effects of a workpiece bending due to its own weight, the effects of pitching due to a change in the manner in which the bed having low rigidity bends in the vertical direction, and the effects of thermal displacement due to heat from a motor and bearings for rotating a rotating tool.

Still another object of the present invention is to provide a turning tool holder which is used in accordance with the method for controlling a combined lathe apparatus having an automatic tool replacing means and used in the combined lathe apparatus having an automatic tool replacing means. Yet another object of the present invention is to provide a blade position registering apparatus which is used in the combined lathe apparatus having an automatic tool replacing means. Still yet another object of the present invention is to provide a blade position detecting apparatus which is used in the combined lathe apparatus having an automatic tool replacing means.

To achieve the foregoing objectives and in accordance with a first aspect of the present invention, a method for controlling a combined lathe apparatus is provided. The combined lathe apparatus includes a workpiece spindle on which a workpiece is mounted, a tool spindle to which a turning process tool for carrying out a turning process on the workpiece is removably attached, automatic tool replacing means for taking out a specific turning process tool from among a plurality of turning process tools and replacing the turning process tool attached to the tool spindle with the specific turning process tool, a movable body which is movable along a second axis which is perpendicular to a first axis that is the axis of the workpiece spindle and forms a predetermined angle $\theta$ ($0<\theta\leq90°$) with a horizontal plane, and a tool headstock supported by the movable body. The tool headstock has the tool spindle. The movable body is movable in a direction including a third axis component which is perpendicular to the first axis and the second axis. The tool spindle can be controlled to be rotated or held without being rotated. A turning process is carried out on the workpiece attached to the workpiece spindle by moving the movable body in a direction including the third axis component in order to move a cutting point of the turning process tool attached to the tool spindle along a horizontal line which is perpendicular to the first axis, or by moving the movable body in a direction including the third axis component, and at the same time, moving the tool headstock along the second axis.

In accordance with a second aspect of the present invention, a combined lathe apparatus is provided that includes a workpiece spindle on which a workpiece is mounted, a tool spindle to which a turning process tool for carrying out a turning process on the workpiece is removably attached, automatic tool replacing means for taking out a specific turning process tool from among a plurality of turning process tools and replacing the turning process tool attached to the tool spindle with the specific turning process tool, a movable body which is movable along a second axis which is perpendicular to a first axis that is the axis of the workpiece spindle and forms a predetermined angle $\theta$ ($0<\theta\leq90°$) with a horizontal plane, a tool headstock supported by the movable body. The tool headstock has the tool spindle, and control means for controlling movement of the movable body. The movable body is movable in a direction including a third axis component which is perpendicular to the first axis and second axis. The tool spindle can be controlled to be rotated or held without being rotated. The control means carries out a turning process on the workpiece attached to the workpiece spindle by moving the movable body in a direction including the third axis component in order to move the cutting point of the turning process tool attached to the tool spindle along a horizontal line which is perpendicular to the first axis, or by moving the movable body in a direction including the third axis component, and at the same time, moving the tool headstock along the second axis.

In accordance with a third aspect of the present invention, a turning tool holder that is removably and coaxially attached to a tool spindle that forms a predetermined angle $\theta$ with a horizontal plane is provided. The turning tool holder is provided with a holder main body on which a turning tool having a turning tip is mounted. The holder main body has a turning tool attachment surface on which the turning tool is attached. The angle formed between the turning tool attachment surface and the axis of the holder main boy is equal to the predetermined angle $\theta$ formed between the axis of the tool spindle and a horizontal plane.

In accordance with a fourth aspect of the present invention, a blade position registering apparatus for registering the position of the blade of the turning process tool which is provided in the combined lathe apparatus according to the second aspect of the present invention is provided. A reference point is provided on the axis of the tool spindle. The blade position registering apparatus includes blade position inputting means and storage means. The blade position inputting means inputs a first tool length which is an amount of offset by which the blade of the turning process tool is offset from the reference point along the first axis, a second tool length which is an amount of offset by which the blade of the turning process tool is offset from the reference point along a horizontal line which is perpendicular to the first axis, and a third tool length which is an amount of offset by which the blade of the turning process tool is offset from the reference point along a vertical line. The storage means stores the inputted first tool length, the second tool length, and the third tool length.

In accordance with a fifth aspect of the present invention, a blade position detecting apparatus is provided that is provided in the combined lathe apparatus according to the second aspect of the present invention, has a plurality of detection surfaces which can make contact with the blade of the turning process tool, and outputs a detection signal when the blade makes contact with one of the detection surfaces. The blade position detecting apparatus includes a first detection surface for detecting the blade of the turning process tool which moves along the axis of the workpiece spindle, a second detection surface for detecting the blade of the turning process tool which moves along a horizontal line that is perpendicular to the axis of the workpiece spindle, and a third detection surface for detecting the blade of the turning process tool which moves along a vertical line.

BRIEF DESCRIPTION OF THE DRAWINGS

FIG. 19 is a table showing a tool registration screen displayed on the display portion;

FIG. 20(A) is a table showing the tool length entry field for tools for X-Z turning displayed on the display portion; and FIG. 20(B) is a table showing the tool length entry field for tools for horizontal turning displayed on the display portion.

DETAILED DESCRIPTION OF THE PREFERRED EMBODIMENTS

First Embodiment

In the following, a combined lathe apparatus and a turning tool holder according to one embodiment of the present invention are described with reference to FIGS. 1 to 7.

Figure 1:
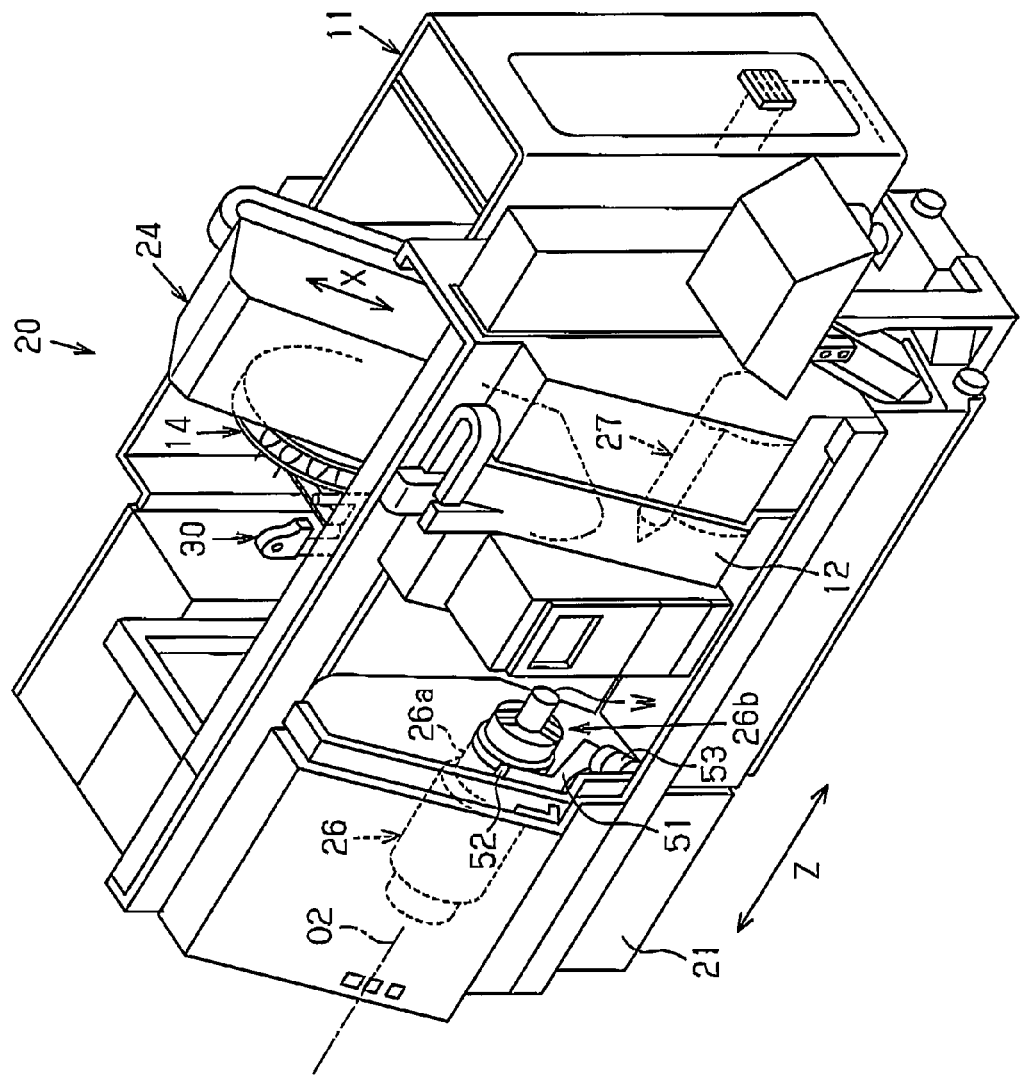
FIG. 1 is a perspective view showing a combined lathe apparatus according to first to third embodiments of the present invention.
Figure 2:
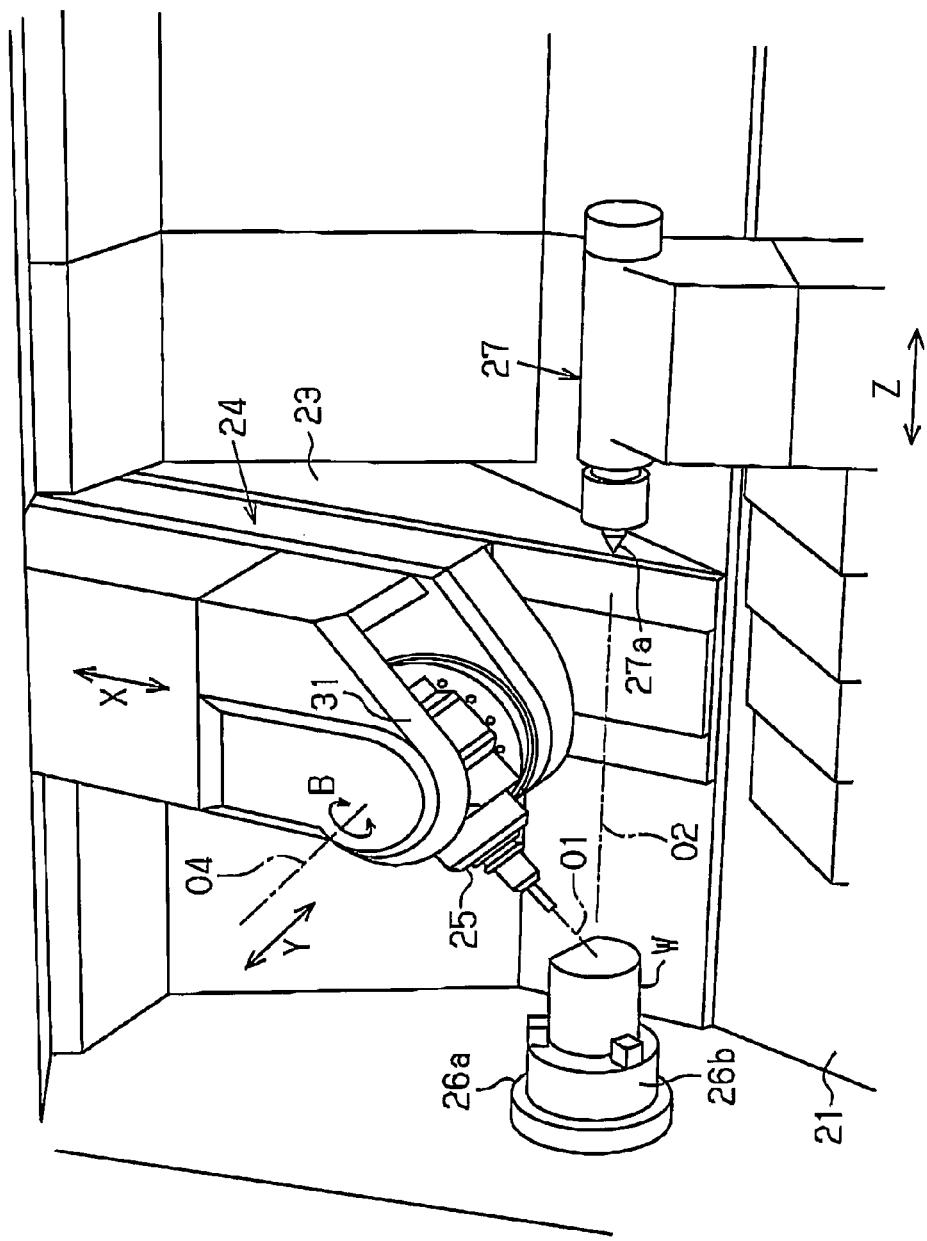
FIG. 2 is an enlarged perspective view showing a portion in the vicinity of the tool headstock of the combined lathe apparatus.

As shown in FIGS. 1 and 2, a CNC combined lathe apparatus (hereinafter referred to as combined lathe apparatus) 20 has a bed 21 and a frame 11 which are in rectangular parallelepiped form and extend in a Z axis. A front door 12 is provided on the front surface of the frame 11 so as to be openable and closeable. A headstock 26 is installed above the bed 21. A workpiece spindle 26a is supported by the headstock 26 so as to be rotatable around an axis O2. The workpiece spindle 26a is placed in such a manner that the axis O2 is parallel to the Z axis.

A chuck 26b is provided in the workpiece spindle 26a. A workpiece W to be processed is mounted on the chuck 26b. A tailstock 27 is placed above the bed 21 so as to face the headstock 26. The tailstock 27 is moveable along the Z axis. A tailstock barrel 27a for supporting an end portion of the workpiece W which is not held by the chuck 26b is provided in the tailstock 27 in accordance with the size, shape or type of process of the workpiece W to be processed.

Furthermore, a known tool magazine 14 is installed on the rear surface side of the workpiece spindle 26a within the frame 11. The tool magazine 14 contains a turning tool unit which is a turning processing tool, as well as a tool unit such as a rotating tool unit. The turning tool unit is made up of a turning tool 45 and a turning tool holder 40 as described below. A known ATC 30 (automatic tool replacing apparatus) is installed in the vicinity of the tool magazine 14. The ATC 30 takes out a tool unit from the tool magazine 14 and mounts it on the below described tool spindle 25 and dismounts the tool unit that has been mounted on the tool spindle 25 and places it into the tool magazine 14.

Figure 3:
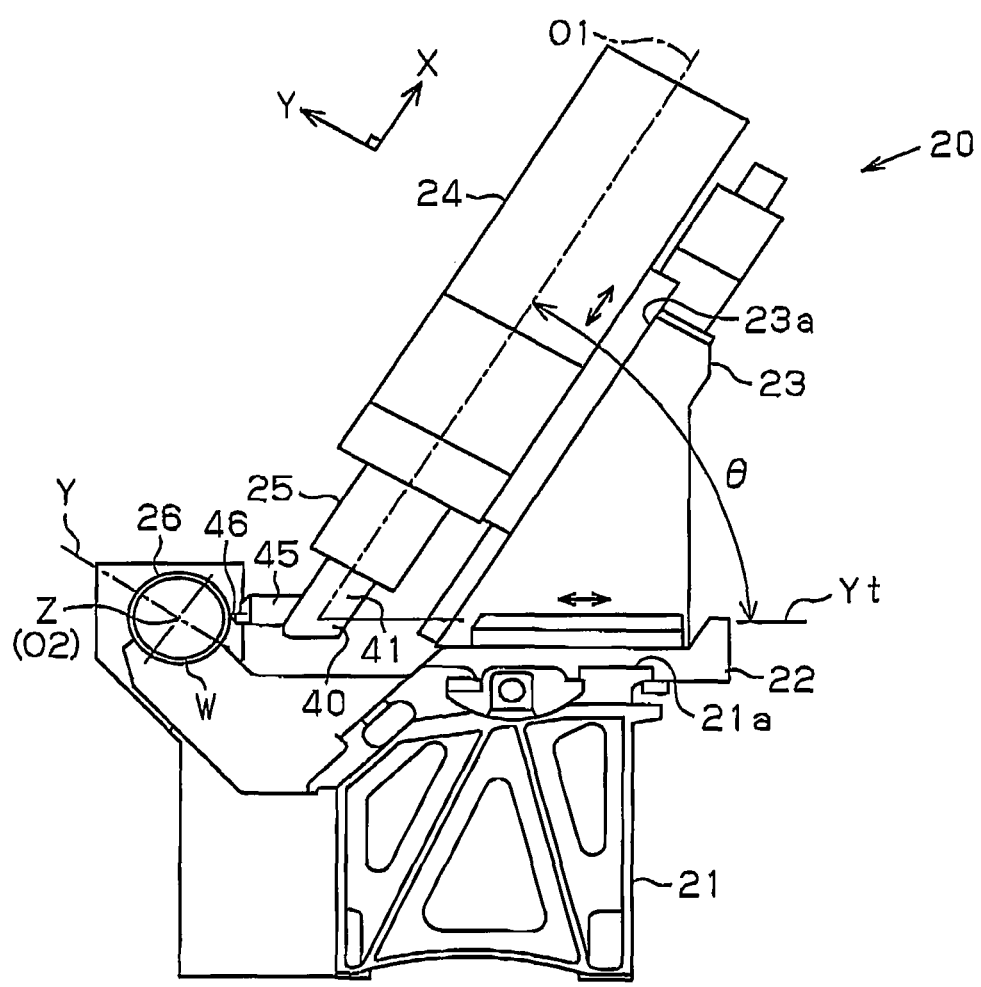
FIG. 3 is a side view showing the combined lathe apparatus.

As shown in FIG. 3, a carriage base 22 is attached to the horizontal surface 21a of the bed 21. A carriage 23, which is a moveable body, is mounted on the carriage base 22. On the horizontal surface 21a of the bed 21, the carriage 23 can be moved along the Z axis, which is referred to as longitudinal movement, and can be moved along the projection line of the Y axis, which is referred to as lateral movement. The lateral movement corresponds to moving the carriage 23 in the direction including a component of the Y axis.

The carriage 23 has a sliding surface 23a which extends along the X axis. The sliding surface 23a inclines by a predetermined angle θ relative to the horizontal surface 21a of the bed 21. The predetermined angle θ may be 45° or 60°, for example, or may be any angle in a range of 0<θ≤90°. The tool headstock 24 is mounted on the sliding surface 23a so as to be slidable along the X axis. In the present embodiment, the Z axis corresponds to the first axis, the X axis corresponds to the second axis, and the Y axis corresponds to the third axis.

As shown in FIG. 2, a tool spindle attachment portion 31 is formed at the lower end of the tool headstock 24. In FIG. 3, the tool spindle attachment portion 31 is omitted for the convenience of the description. The tool spindle 25 is supported by the tool spindle attachment portion 31 so as to be rotatable. The tool spindle 25 rotates around the axis O4 which is perpendicular to the X-Z plane in the direction of the B axis in FIG. 2. The tool spindle 25 forms a portion of the main body of the tool headstock 24.

A B axis drive motor Mb (see FIG. 4) is incorporated into the tool headstock 24. A power transmission means (not shown) made up of gears, shafts and the like is provided between the B axis drive motor Mb and the tool spindle 25. The power transmission means transmits the power from the B axis drive motor Mb to the tool spindle 25. As a result, the tool spindle 25 rotates around the axis O4 in the direction of the B axis.

Furthermore, a fixture means (not shown) for fixing the tool spindle 25 to the tool spindle attachment portion 31 or releasing the fixture is provided between the tool spindle attachment portion 31 and the tool spindle 25. The power transmission means and the fixture means rotate the tool spindle 25 in the direction of the B axis in FIG. 2 and at the same time position the tool spindle 25 at a predetermined angle. The axis O1 of the tool spindle 25 is parallel to the sliding surface 23a of the carriage 23, that is to say, the X axis.

Next, the turning tool holder 40 is described with reference to FIGS. 5 and 6.

The turning tool holder 40 is provided with a holder main body 41. A mounting portion 42 in truncated cone form is formed in the proximal end portion of the holder main body 41. The holder main body 41 and the mounting portion 42 are coaxially arranged. The holder main body 41 is attached to the tool spindle 25 via the mounting portion 42 so as to be coaxial with the axis O1 and removable.

Figure 5:
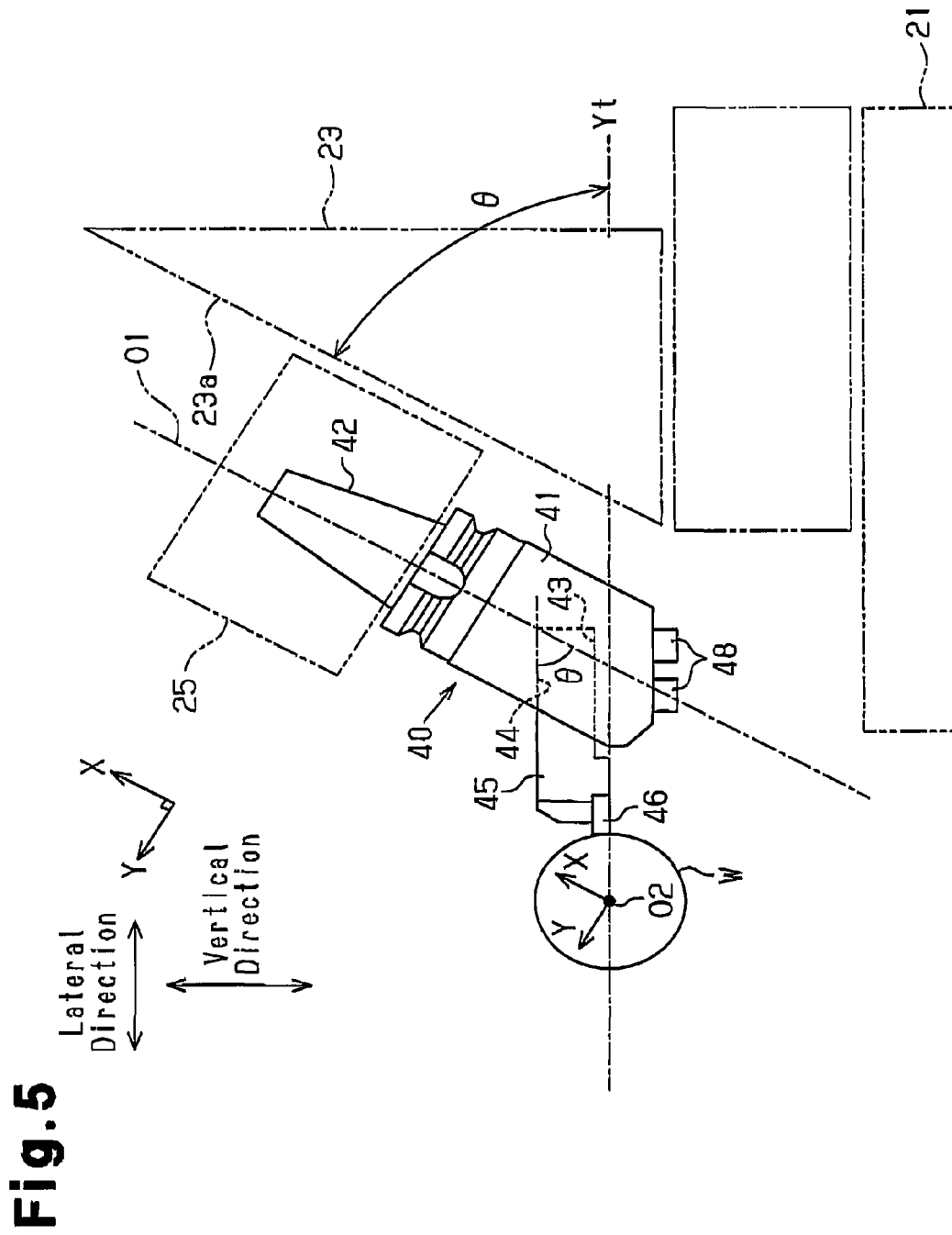
FIG. 5 is a diagram illustrating the positional relationship between the carriage, the tool spindle, the turning tool holder, and the workpiece.
Figure 6B:
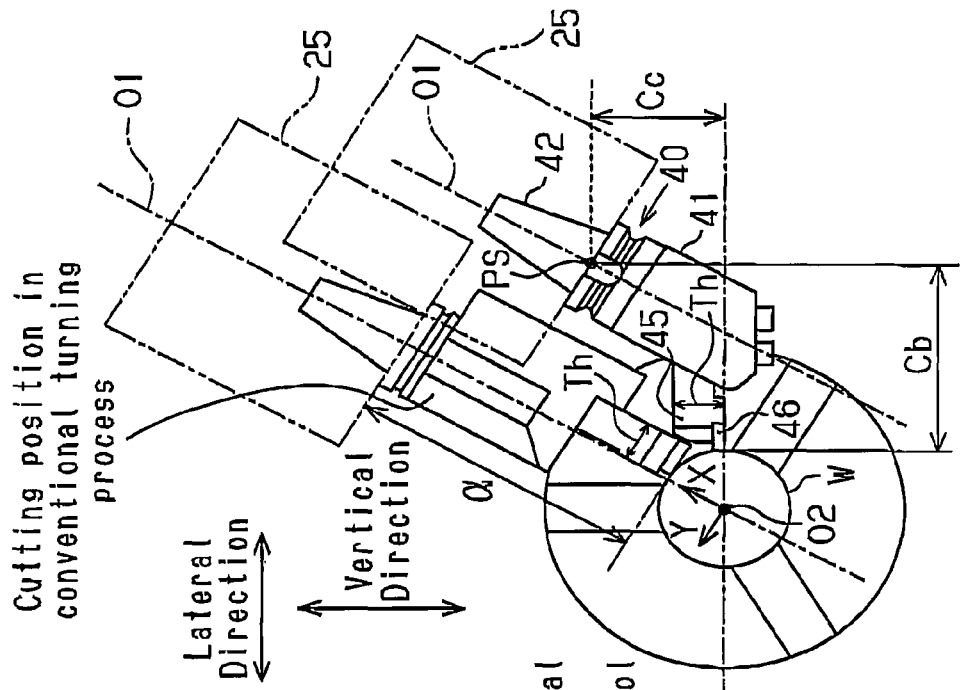
FIG. 6(B) is a schematic side view for comparing the position of the turning processing tool between the prior art and the present embodiment.
Figure 6A:
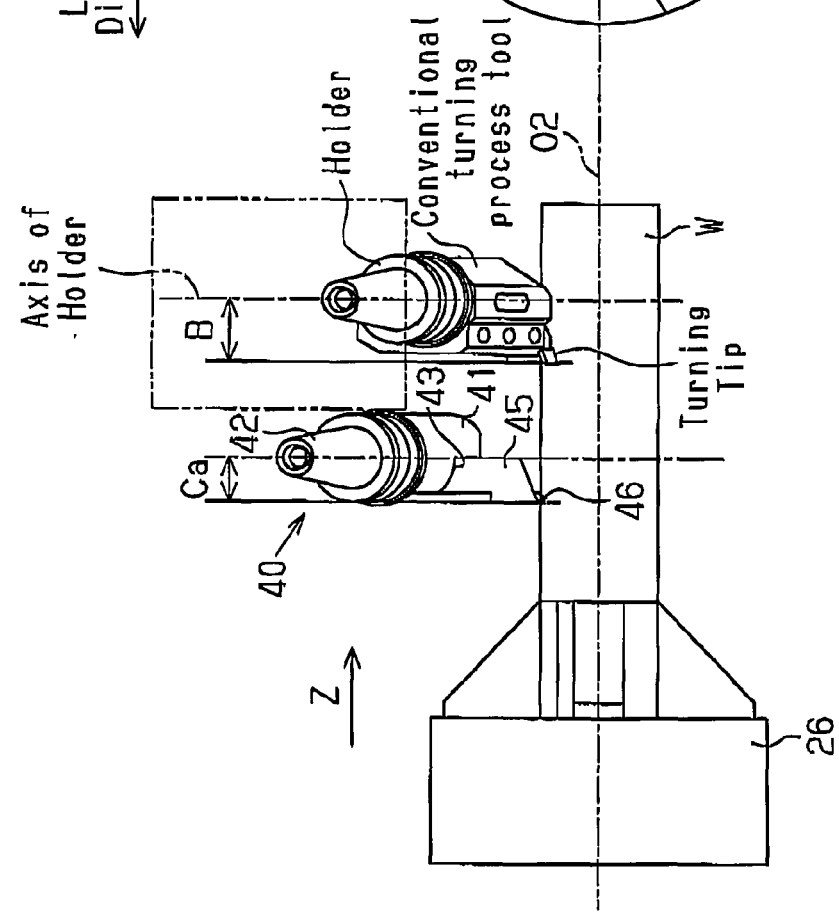
FIG. 6(A) is a diagram for comparing the position of the turning processing tool between the prior art and the present embodiment.

As shown in FIGS. 5 and 6(A), an attachment groove 43 is provided on one side surface of the holder main body 41. The attachment groove 43 has an opening facing the workpiece W. The surface which is in close proximity to the mounting portion 42 from among the inner surfaces of the attachment groove 43 is referred to as a turning tool attachment surface 44. As shown in FIG. 5, the turning tool attachment surface 44 makes a predetermined angle θ relative to the axis of the holder main body 41.

The turning tool 45 is mounted in the attachment groove 43 of the holder main body 41. The turning tool 45 is fixed to the lower end surface of the holder main body 41 using bolts 48. The distal end of the turning tool 45 protrudes from the attachment groove 43 along the horizontal line Yt. A turning tip 46 is provided at the distal end of turning tool 45. The horizontal line Yt is a straight line included in both of the X-Y plane and the horizontal plane. The X-Y plane corresponds to a plane with the second and third axes.

Next, a control apparatus 100 is described with reference to FIG. 4.

A combined lathe apparatus 20 is provided with a control apparatus 100. As shown in FIG. 4, the control apparatus 100 has a main control section 110 made of a CPU as control means. A process program memory 120, a system program memory 130, a buffer memory 140, a process control section 150, an control panel 160 having a keyboard and the like, and a display portion 170 made of a liquid crystal display apparatus are connected to the main control section 110 via a bus line 105.

An X axis control section 200, a Yt axis control section 210, a Z axis control section 220 and a B axis control section 230 are connected to the main control section 110 via the bus line 105. Each axis control section receives a move command relative to the axis from the main control section 110. The respective axis control sections output the move command relative to axes to the drive circuits 202, 212, 222 and 232. The respective drive circuits 202, 212, 222 and 232 receive the corresponding move command and drive the motor of the axes (X, Yt, Z and B axis drive motors).

When an X axis drive motor Mx is driven, the tool spindle 25 moves along the X axis on the sliding surface 23a of the carriage 23. When a Yt axis drive motor Myt is driven, the carriage 23 moves along the horizontal line Yt, and together with this, the tool spindle 25 also moves along the horizontal line Yt. When a Z axis drive motor Mz is driven, the carriage 23 moves along the Z axis, and together with this, the tool spindle 25 also moves along the Z axis.

A workpiece spindle control section 240 is connected to the main control section 110 via the bus line 105. The workpiece spindle control section 240 receives a rotation command from the main control section 110 and outputs this rotation command to a drive circuit 242. The drive circuit 242 receives the rotation command from the main control section 110 and rotates the workpiece spindle drive motor $M_{WS}$.

A tool spindle control section 250 is connected to the main control section 110 via the bus line 105. The tool spindle control section 250 receives a rotation command from the main control section 110 and outputs a spindle speed signal to a drive circuit 252. The drive circuit 252 rotates a built-in type motor $M_{TS}$ which is linked to the tool spindle 25 at a rotational speed corresponding to a rotation control command on the basis of a spindle speed signal from the tool spindle control section 250. As a result, the rotating tool unit rotates together with the tool spindle 25. The main control section 110 outputs a stop control command to the tool spindle control section 250 when a turning process tool is used. The tool spindle control section 250 receives the stop control command from the main control section 110 and stops the motor $M_{TS}$.

Next, the operation of the combined lathe apparatus 20 is described.

A turning tool holder 40 is attached to the tool spindle 25 for the convenience of description. In addition, it is assumed that the axis O1 of the tool spindle 25 rotates around the B axis in a direction parallel to the X axis, and the axis O1 is already positioned. The tool spindle control section 250 stops the motor $M_{TS}$ in this state. The control apparatus 100 follows a process program stored in the process program memory 120 and outputs an instruction to rotate to the workpiece spindle control section 240, and rotates the workpiece spindle drive motor $M_{WS}$.

In the control apparatus 100, the main control section 110 follows the above described process program and outputs a move command to the X axis control section 200. The X axis control section 200 outputs the move command to the drive circuit 202 and drives the X axis drive motor $M_X$. As a result, the tool headstock 24 moves along the axis O1 of the tool spindle 25. As a result, as shown in FIG. 3, the blade of the turning tip 46 of the turning tool 45 is positioned in a straight line included in a horizontal plane including the axis O2 of the workpiece spindle 26a and the X-Y plane.

In this state, the main control section 110 outputs a move command to the Yt axis control section 210. The Yt axis control section 210 outputs the move command to the drive circuit 212. The drive circuit 212 drives the Yt axis drive motor Myt, and thus, the carriage 23 moves along the horizontal line Yt, and together with this, the tool spindle 25 also moves along the horizontal line Yt. In addition, the main control section 110 follows the process program stored in the process program memory 120 and outputs a move command to the Z axis control section 220. The Z axis control section 220 outputs the move command to the drive circuit 222. The drive circuit 222 drives the Z axis drive motor $M_Z$, and thus, the carriage 23 moves along the Z axis, and together with this, the tool spindle 25 also moves along the Z axis.

As described above, when the tool spindle 25 moves along the horizontal line Yt, the workpiece W is cut along the horizontal line Yt by the turning process tool. In this state, the turning tip 46 of the turning tool 45 moves along the Z axis together with the tool spindle 25, and thus, a turning process is carried out on the workpiece W. The point at which the turning tip 46 carries out a cutting process on the workpiece W is referred to as cutting point. Accordingly, the workpiece W is cut along the horizontal line Yt by the turning tool 45 when the cutting point moves in the direction perpendicular to the Z axis.

As described above, the longer the workpiece W is, the more the workpiece bends due to its own weight. Concerning this, in the present embodiment, in the case where a turning process is carried out on the outer peripheral surface of the workpiece W, the workpiece bending due to its own weight does not directly affect the precision in the process. That is to say, unlike with the prior art, the effects of the workpiece bending are avoided, even when the workpiece W is long.

Figure 15:
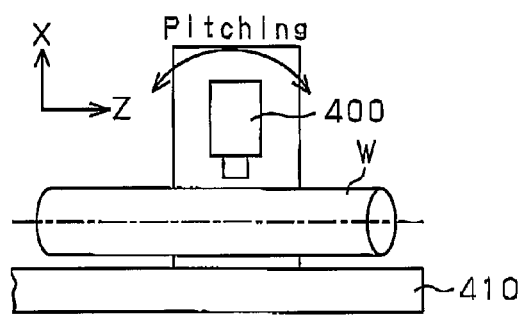
FIG. 15 is a diagram illustrating pitching.

In addition, the bed 21 is thin and extends along the horizontal line Yt. Therefore, it can be considered that the manner in which the bed 21 bends may easily change in the vertical direction, in which the rigidity is low. This means that the pitching changes as shown in FIG. 15. In the present embodiment, however, the effects of pitching described above are suppressed by cutting the workpiece W along the horizontal line Yt.

(Amount of Reduction Due to Bending of Workpiece W)

In the case where an iron material having a diameter of 100 mm×a length of 1270 mm is used as the workpiece W, the amount of bending δ becomes 20 µm, as shown in the formula (1). Bending of the workpiece W becomes the maximum in the center portion of the workpiece W. Therefore, in the case where the height of the combined lathe apparatus is constant, the height of the workpiece W becomes the least in the center portion of the workpiece W. In the case where a turning process is carried out in accordance with a conventional method, the cylindricity, which indicates the precision in the process of the workpiece W, becomes 40 µm and a big problem arises in terms of the precision of processing.

Figure 11:
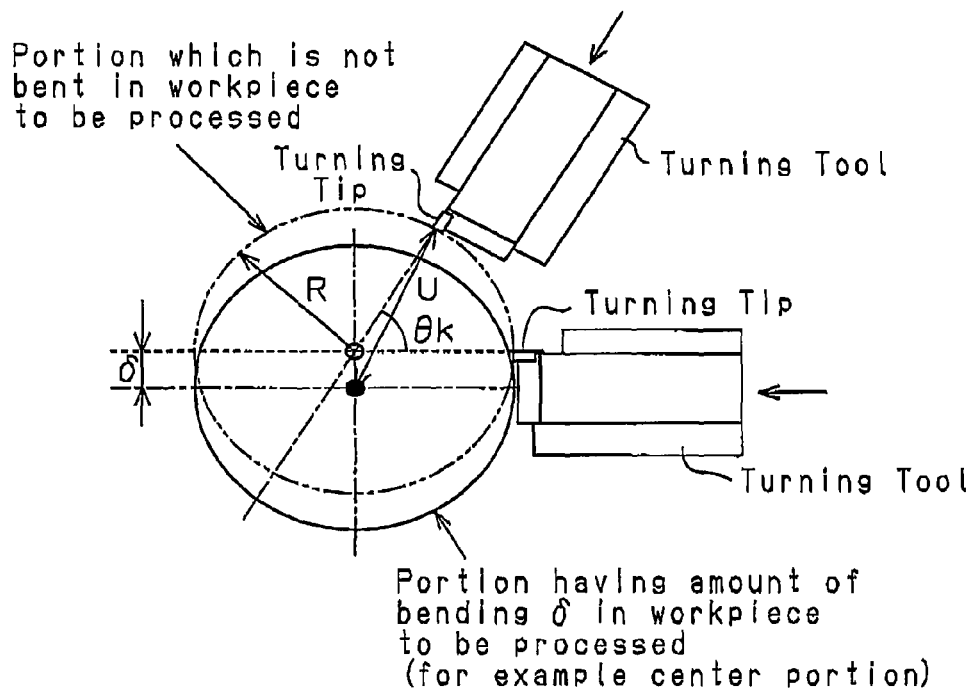
FIG. 11 is a diagram illustrating cases where a portion of the workpiece which is bent is turned and a portion of the workpiece which is not bent is turned.

A calculation formula for obtaining the amount of reduction in the cylindricity due to the workpiece bending is shown below. FIG. 11 shows a method for turning a portion where the workpiece is bent and a portion where the workpiece is not bent. The amount of reduction A1 in the cylindricity due to the workpiece bending in the case where the workpiece W is cut along the horizontal line Yt can be represented by the following formula (2).

$$A1 = (\sqrt{R^2 + \delta^2} - R) \times 2 \quad (2)$$

In the case where the radius R of the workpiece W is 50 mm and δ is 20 µm, A1 becomes 7.9 nm, as calculated using the above formula (2). In addition, in the case where cutting is carried out on a workpiece which is in such a position as to be inclined by a cutting angle θk relative to the horizontal line Yt, the amount of reduction A2 in the cylindricity due to the workpiece bending can be represented by the following formula (3).

$$A2 = U - R \quad (3)$$
$$= \left(\sqrt{(R \cdot \sin\theta k + \delta)^2 + ((R \cdot \cos\theta k)^2} - R\right) \times 2$$

R: radius of a finished workpiece as instructed by a process program

δ: amount of bending in a portion where the workpiece is bent most (for example, in the center of workpiece in the longitudinal direction)

U: the minimum distance between the center of the workpiece and the blade in a portion where the workpiece is bent most In the case where the radius R of the workpiece W is 50 mm, δ is 20 µm and the cutting angle θk is 90 degrees, A2 becomes 40 µm as calculated using the above formula (3).

In addition, in the case where the radius R of the workpiece W is 50 mm, δ is 20 µm and the cutting angle θk is 60 degrees, A2 becomes 34 µm as calculated using the above formula (3). In addition, in the case where the radius R of the workpiece W is 50 mm, δ is 20 µm and the cutting angle θk is 45 degrees, A2 becomes 28 µm as calculated using the above formula (3).

Thus, the amount of reduction in the cylindricity can be kept small to a negligible degree in accordance with the method for cutting the workpiece along the horizontal line Yt.

Figure 13:
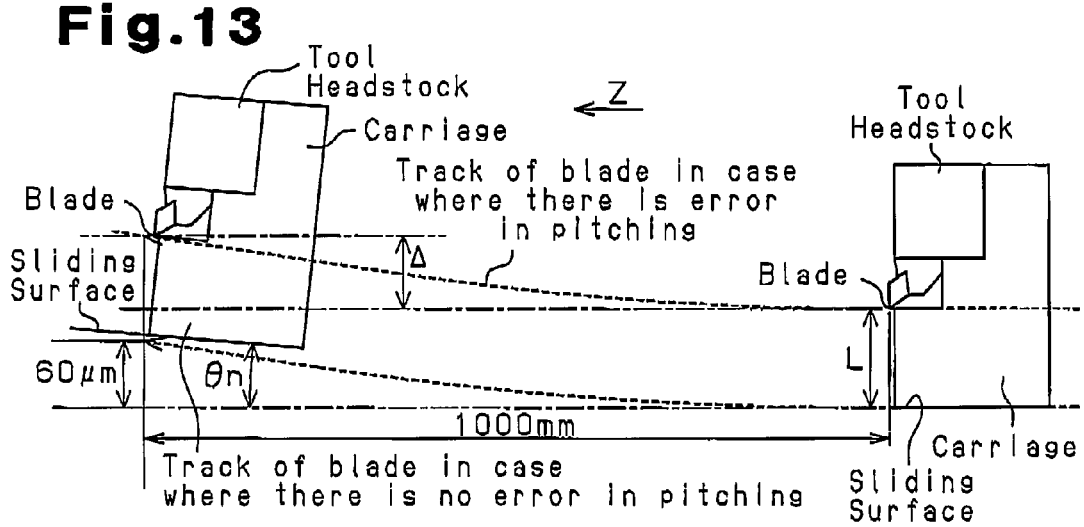
FIG. 13 is a diagram illustrating an error in pitching.
Figure 14:
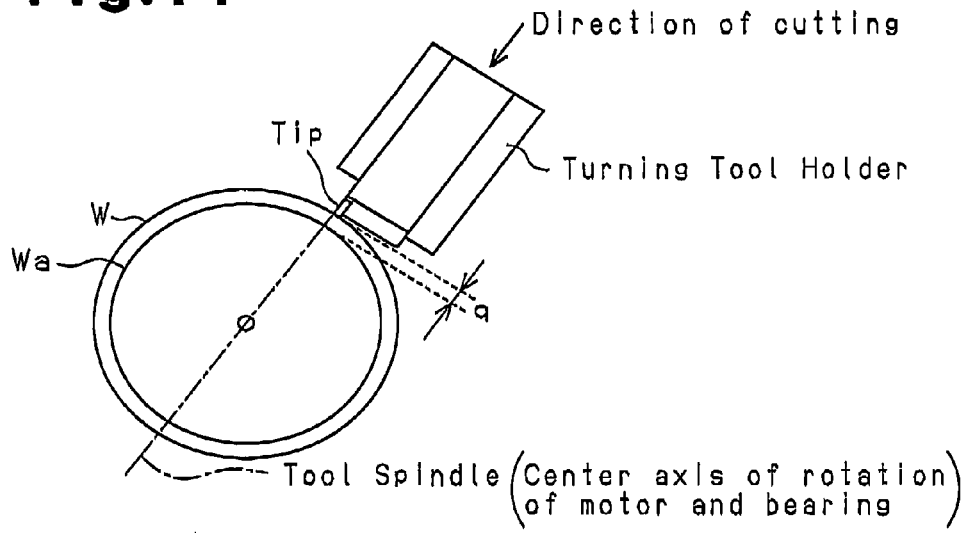
FIG. 14 is a diagram illustrating thermal displacement.

Next, error in the pitching is described with reference to FIG. 13. FIG. 13 shows a case where a conventional turning method is used on a workpiece W. The tool headstock moves along the vertical straight line and the turning tool also moves along the vertical straight line. In ISO 10791-1, for example, the allowance value of the precision in the pitching is defined as being within 60 µm per 1000 mm. In the case of the prior art shown in FIG. 13, change "Δ" in the location of the blade in the direction of the height can be represented by the following formula.

$$\Delta = L \times \cos\theta n - (L - 60\ \mu m) = L(\cos\theta n - 1) + 60\ \mu m$$

L: distance between sliding surface of carriage of bed 21 and blade of turning tip 46 (µm)

θn: error in pitching (deviation in angle accompanying movement along Z axis)

θn=tan(60/1000000), and therefore, cos θn=0.999994, and when it is assumed that L=1000 mm from the actual machine size, for example, Δ=54 µm. In the case of L=2000 mm, Δ=48 µm. In the case of Δ=54 µm, the cylindricity of the workpiece W after processing is 108 µm, which is a big problem.

Figure 12:
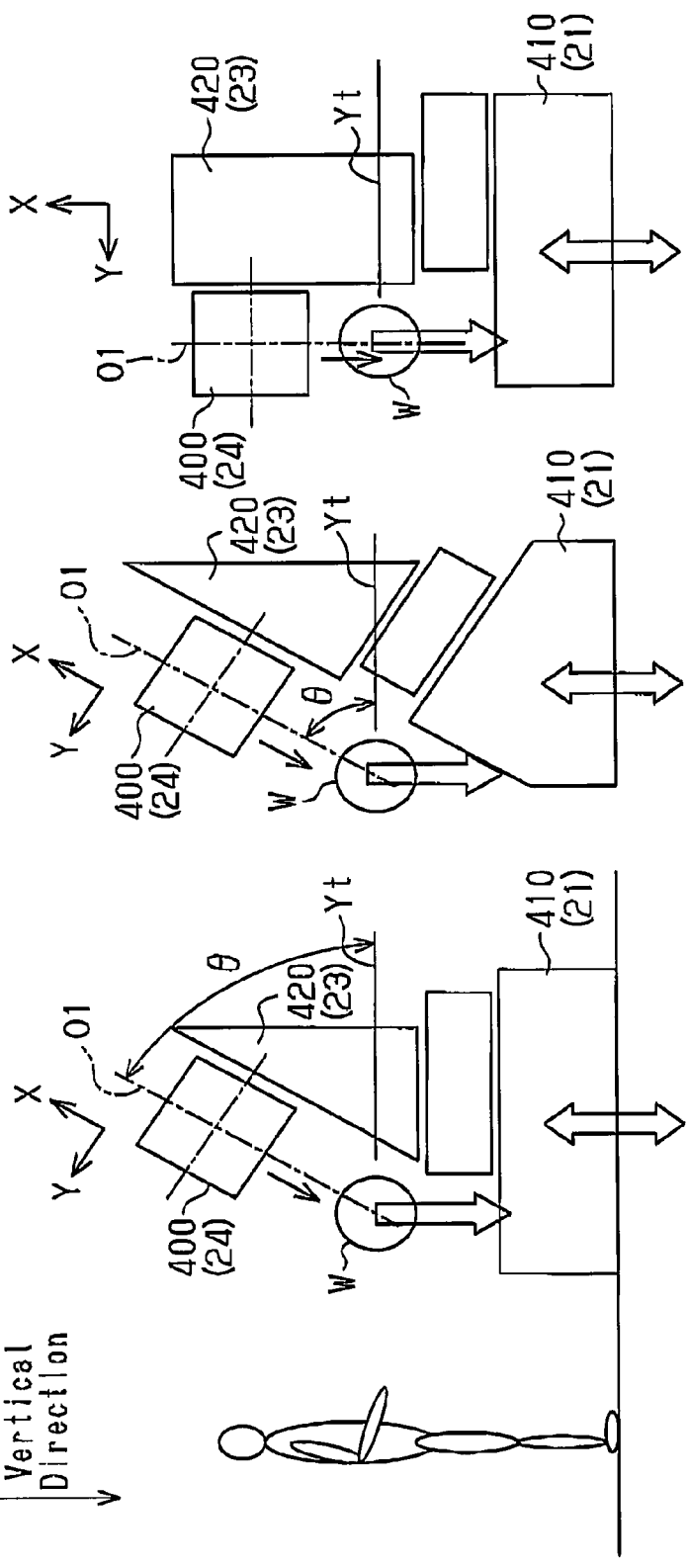
FIGS. 12(A) to 12(C) are schematic diagrams showing various types of combined lathe apparatuses.

A case where the combined lathe apparatus 20 shown in FIG. 12(A) is used is described below. In the case where the workpiece W is cut along the horizontal line Yt, the amount of reduction A3 in the cylindricity due to the error in pitching can be represented by the following formula (4).

$$A3 = (\sqrt{R^2 + \Delta^2} - R) \times 2 \quad (4)$$

In the case where the radius R of the workpiece W is 50 mm and Δ=54 µm, A3 becomes 0.1 µm as calculated using the above formula (4). In addition, in the case where the workpiece is cut in such a position as to be inclined by the cutting angle θk relative to the horizontal line Yt, the amount of reduction A4 in the cylindricity due to error in pitching can be represented by the following formula (5).

$$A4 = (\sqrt{(R \cdot \sin\theta k + \Delta)^2 + (R \cdot \cos\theta k)^2} - R) \times 2 \quad (5)$$

In the case where the radius R of the workpiece W is 50 mm, Δ is 54 µm and the cutting angle θk is 60 degrees, A4 becomes 92 µm as calculated using the above formula (5). Thus, the amount of reduction A3 is so small as to be negligible, as compared to A4.

Next, thermal displacement is described.

Thermal displacement occurs in the tool spindle 25 and the rotating tool in the direction of the axes, due to heat emitted from the motor $M_{TS}$ and the bearing. In this case, the turning process tool is indirectly subjected to the effects of heat from the motor $M_{TS}$ and the bearing, even after the rotating tool unit is changed to the turning process tool.

Figure 18:
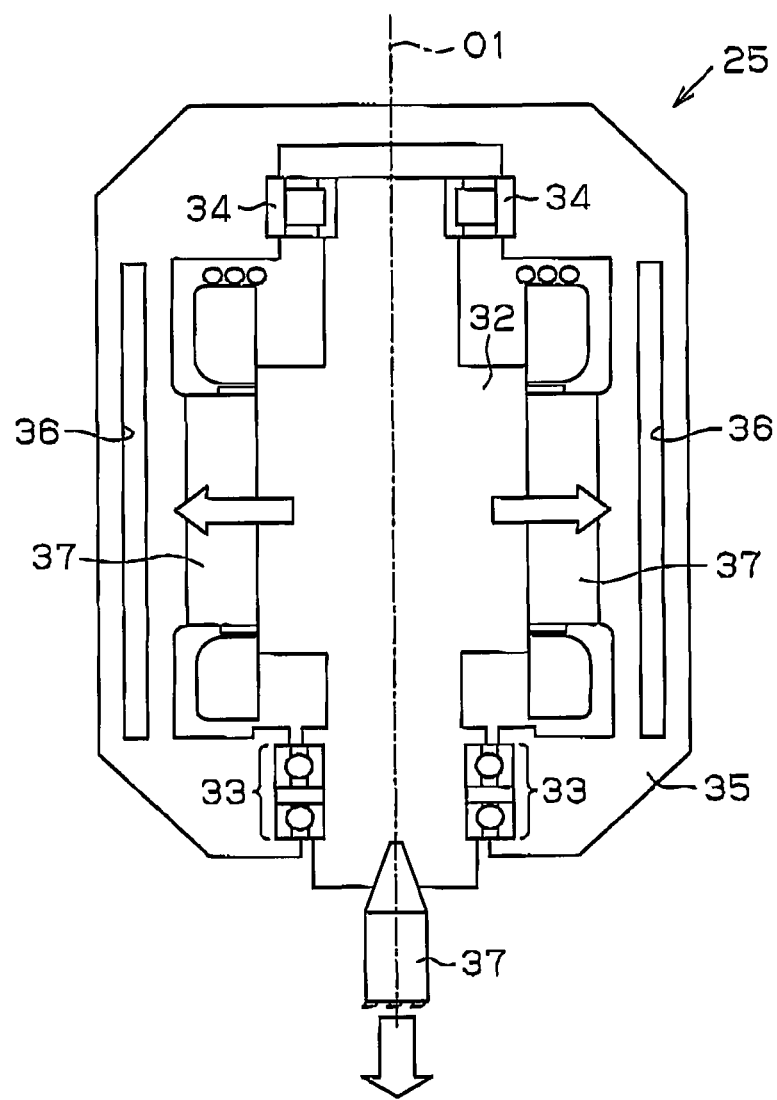
FIG. 18 is a schematic cross-sectional view showing the tool headstock.

FIG. 18 shows the internal structure of the tool spindle 25.

As shown in FIG. 18, a stator 37 is provided on the inner surface of an external cylinder 35 in such a manner as to surround a rotor 32. The rotor 32 is supported with bearings 33 and 34 in such a manner as to be rotatable relative to the external cylinder 35. In addition, a tool unit, for example a rotating tool unit, is attached to a distal end of the rotor 32. In addition, a cooling circuit 36 is incorporated in the external cylinder 35. A liquid of which the temperature is controlled flows through the cooling circuit 36. Therefore, "thermal displacement in a direction perpendicular to the axis of the tool spindle 25" is generally kept smaller than the "thermal displacement in the direction of the axis of the tool spindle 25." The arrows in FIG. 18 indicate the direction of thermal displacement.

Figure 16:
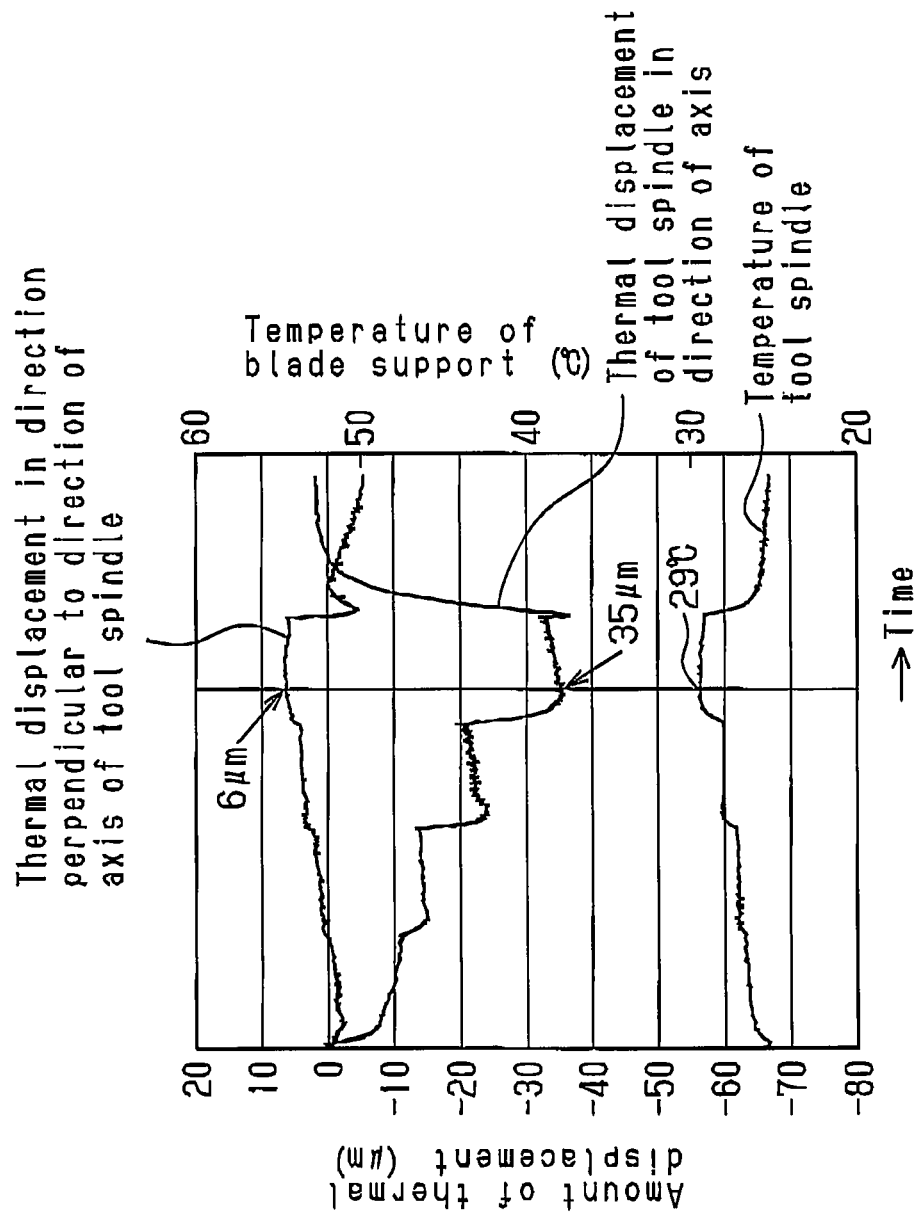
FIG. 16 is a graph showing the amount of thermal displacement along the axis of the spindle of the tool and the amount of thermal displacement in the direction perpendicular to the axis of the spindle of the tool.

Next, thermal displacement which occurs along the axis of the tool spindle 25 and thermal displacement which occurs in a direction perpendicular to the axis are addressed. FIG. 16 is a graph showing the relationship between the amount of thermal displacement which occurs along the axis of the tool spindle 25 and the amount of thermal displacement which occurs in the direction perpendicular to the axis of the tool spindle 25. As shown in FIG. 16, thermal displacement which occurs along the axis of the tool spindle 25 becomes greater than the thermal displacement which occurs in a direction perpendicular to the axis as the temperature of the tool headstock 24 increases. Therefore, thermal displacement which occurs along the axis of the tool spindle 25 affects the turning process tool attached to the tool spindle 25.

Figure 17:
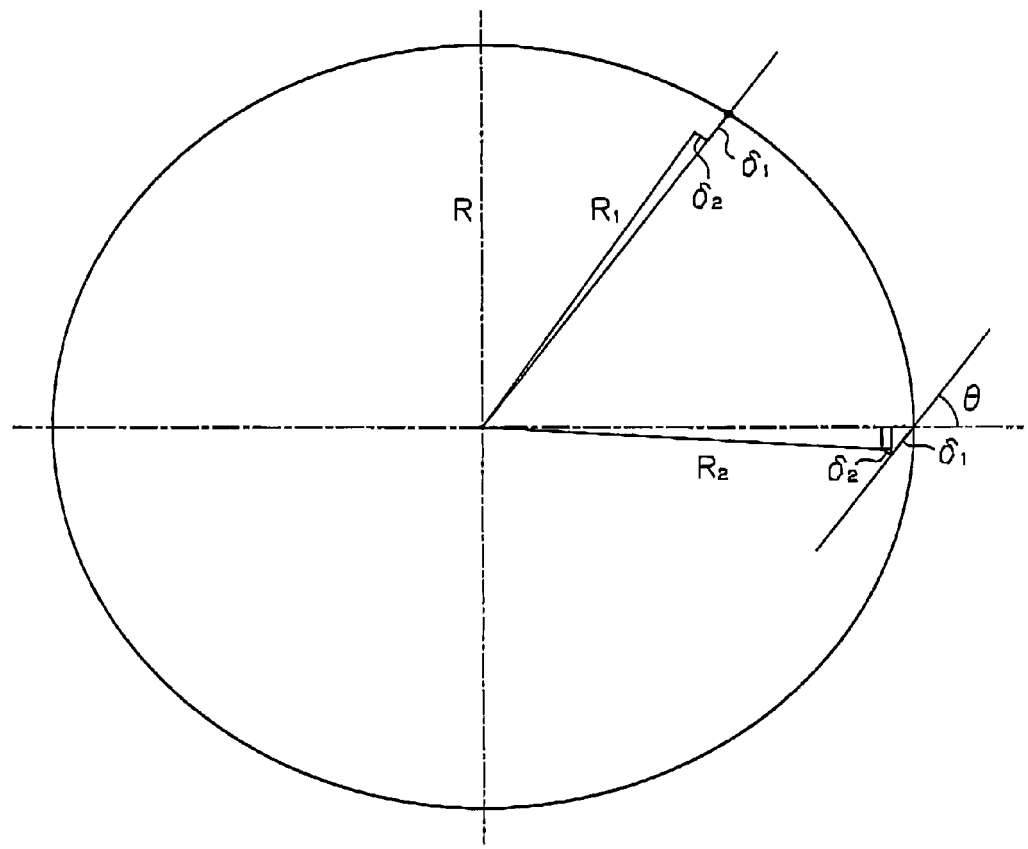
FIGS. 17(A) and 17(B) are diagrams illustrating the amount of thermal displacement along the axis of spindle of the tool and the amount of thermal displacement in the direction perpendicular to the axis of the spindle of the tool.
Figure 17:
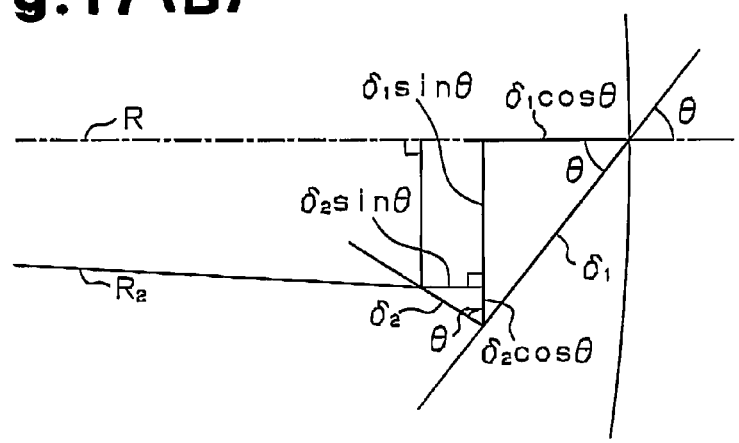

In the following, the effects of thermal displacement are described using concrete numbers. In this description, as shown in FIG. 16, the amount of thermal displacement along the axis of the tool spindle 25 is 35 μm ($=\delta_1$) and the amount of thermal displacement in a direction perpendicular to the axis of the tool spindle 25 is 6 μm ($=\delta_2$) when the temperature of the tool spindle 25 is 29° C. As shown in FIGS. 17(A) and 17(B), when a turning process is carried out on the outer peripheral surface of the workpiece W so that the outer diameter of the workpiece W becomes R=50 mm after processing, a case where the workpiece is cut at a predetermined angle θ as in the prior art and a case where a turning process is carried out on the workpiece W along a horizontal line as in the present embodiment are compared.

The radius $R_1$ of the workpiece W after processing in the case where a conventional method is used can be calculated using the following formula.

$$R_1 = \sqrt{(R-\delta_1)^2 + \delta_2^2}$$

The radius $R_1$ of the workpiece W after processing in this case is $R_1$=49.965 (mm), irrespectively of θ in the combined lathe apparatus 20. Accordingly, in this case, R–$R_1$=35 (μm), and there is an error of 35 μm, irrespectively of the angle θ.

Meanwhile, in the case where a turning process is carried out on the workpiece W along the horizontal line, as in the present embodiment, the radius of workpiece after processing can be calculated using the following formula, when θ=60° in the combined lathe apparatus 20.

$$R_2 = \sqrt{(R-(\delta_1\cos\theta+\delta_2\sin\theta))^2 + (\delta_1\sin\theta-\delta_2\cos\theta)^2}$$

Here, $R_2$=49.977 (mm) when θ=60°.
Accordingly, there is an error of R–$R_2$=23 (μm).
In addition, when θ=45°, $R_2$=49.971 (mm).
Accordingly, there is an error of R–$R_2$=29 (μm).
In addition, when θ=90°, $R_2$=49.994 (mm).
Accordingly, there is an error of R–$R_2$=6 (μm).

As described above, in the case where a turning process is carried out horizontally on a workpiece, the effects of thermal displacement are made smaller than in the case where a conventional method is used.

As described above, in the present embodiment, a turning process is carried out on the workpiece W, which is attached to the workpiece spindle 26a, by moving the carriage 23 in a direction including the Y axis component, so that the cutting point of the turning process tool moves along the horizontal line Yt. As a result, the effects of the workpiece W bending due to its own weight, the effects of pitching and the effects of thermal displacement due to the motor and the bearings are simultaneously suppressed.

In addition, as shown in FIG. 5, in the turning tool holder 40 in the present embodiment, the angle formed between the surface 44 to which the turning tool is attached and the axis of the holder main body 41 is the same as the predetermined angle θ formed between the axis O1 of the tool spindle 25 and the horizontal surface 21a. As a result, a method for controlling the combined lathe apparatus 20 having an ATC 30, as well as a turning tool holder which can be used for combined lathe apparatuses having an ATC 30, are provided.

Second Embodiment

According to the prior art, a turning process is carried out on a workpiece W in the cutting location shown in FIG. 6(B) and in the X-Z plane. At this time, the blade of the turning process tool is located in the X-Z plane, which includes the center around which the workpiece W rotates, and along the axis O1 of the tool spindle 25. Positioning of the turning process tool in this location is referred to as core height adjustment. This core height adjustment is known to have an effect on the precision in processing and the quality of the processed surface. A turning tool is attached to the turning tool holder, and a turning tip is attached to the turning tool. The thickness Th of commercially available turning tools, to which a turning tip is attached, is usually standardized. The turning tool holder is designed taking the thickness Th of the turning tool into consideration so that the blade of the turning tool coincides with the axis O2 of the workpiece spindle 26a. That is to say, the turning tool holder is fabricated so as to be positioned in the X-Z plane at the time of the turning process. Thus, the turning process tool is positioned, and therefore, it is not necessary for the operator to carry out the above described core height adjustment in the case where a turning process is carried out on the workpiece W.

In the case where a turning process is carried out in the combined lathe apparatus 20 according to the first embodiment, however, as shown in FIG. 6(B), it is necessary to position the turning process tool so that the blade of the turning tip 46 coincides with the "horizontal axis perpendicular to the axis O2 of the workpiece W." It is necessary for the operator to carefully carry out this core height adjustment. Concretely, it is necessary to add a program for positioning the X and Y axes in order to carry out the core height adjustment. At this time, in order to check whether the core height adjustment has been carried out correctly, an end surface of a workpiece W is cut using the process tool of which the core height has been adjusted, and the above described program is finely adjusted until there is no area left uncut on the end surface of the workpiece W. At this time, the end surface of the workpiece W is cut repeatedly, and therefore, a problem arises that it takes a tremendous amount of time and effort.

As means for solving this problem, it is desirable to provide a blade position registering apparatus 60 with the combined lathe apparatus 20 in addition to the combined lathe apparatus 20 and the turning tool holder 40 in the first embodiment.

The configuration of the blade position registering apparatus 60 is described below with reference to FIGS. 1 to 7, 19 and 20. In the second embodiment, a blade position registering apparatus 60 is additionally provided in the configuration of the first embodiment. Accordingly, the same symbols are attached to the same components as in the first embodiment, and the descriptions thereof are omitted.

Figure 4:
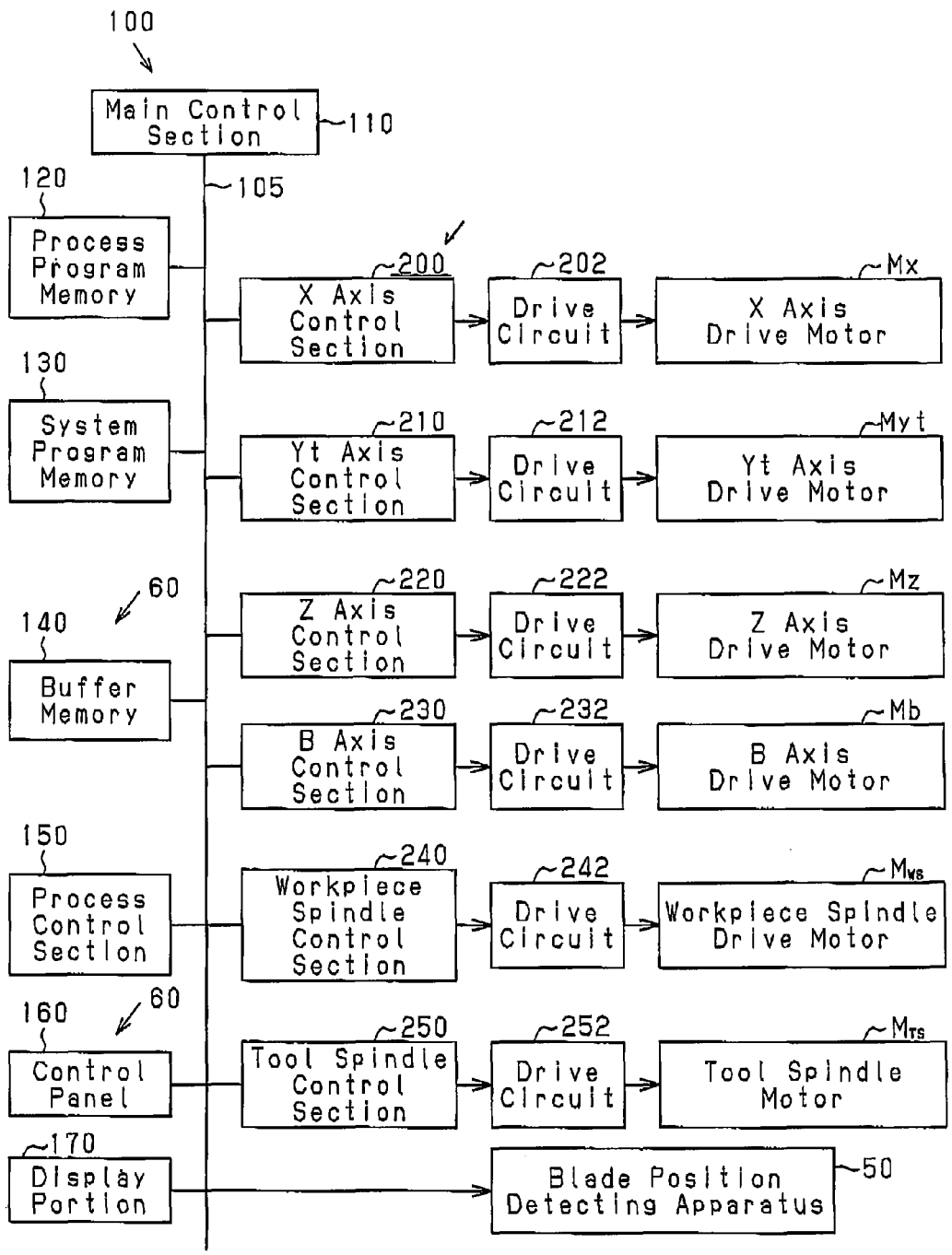
FIG. 4 is a block diagram showing a control apparatus.

As shown in FIG. 4, the blade position registering apparatus 60 is provided with a control panel 160 and a buffer memory 140. The control panel 160 corresponds to the blade position inputting means, and the buffer memory 140 corresponds to a storage means.

As shown in FIG. 19, the operator operates the control panel 160 and displays a tool registering screen 171 on the display portion 170. The operator inputs a string of letters "TOOL-C," for example, into the tool name field as the tool name. In addition, the operator inputs "tool for turning X-Z plane," "tool for horizontal turning," or a name of another tool, such as a rotating tool, in the tool type field. As shown in FIG. 20(B), a tool length entry field 172 for a tool for horizontal turning is displayed on the screen of the display portion 170. The operator inputs a first tool length Ca, a second tool length Cb and a third tool length Cc, respectively, into the entry field "TOOL-C" of the tool length entry field 172. The main control section 110 stores the inputted tool length in the buffer memory 140.

As shown in FIGS. 6(A) and 6(B), the first tool length Ca is the amount of offset by which the blade of the turning tip 46 is offset along the axis O2 of the workpiece spindle 26a from the reference point PS along the axis O1 of the tool spindle 25. The reference point PS is in a predetermined location along the axis O1 of the tool spindle 25. Although in the present embodiment the intersection of the end surface of the tool spindle 25 and the axis O1 of the tool spindle 25 is the reference point PS, the invention is not limited to this. That is to say, the reference point PS may be in any location that can be easily specified along the axis O1 of the tool spindle 25. The first tool length Ca corresponds to a conventional tool length B. The tool length B corresponds to a fourth tool length. The tool length B is the amount of offset by which the blade of the conventional turning tool is offset along the axis O2 of the workpiece spindle 26a from the reference point PS along the axis O1 of the tool spindle 25.

The second tool length Cb is the amount of offset by which the blade of the turning tip 46 is offset along the horizontal line Yt from the reference point PS. The second tool length Cb is used to correct the diameter of the processed workpiece W and changed depending on the length of the turning tool to be used and the manner in which the turning tool to be used protrudes.

Figure 7:
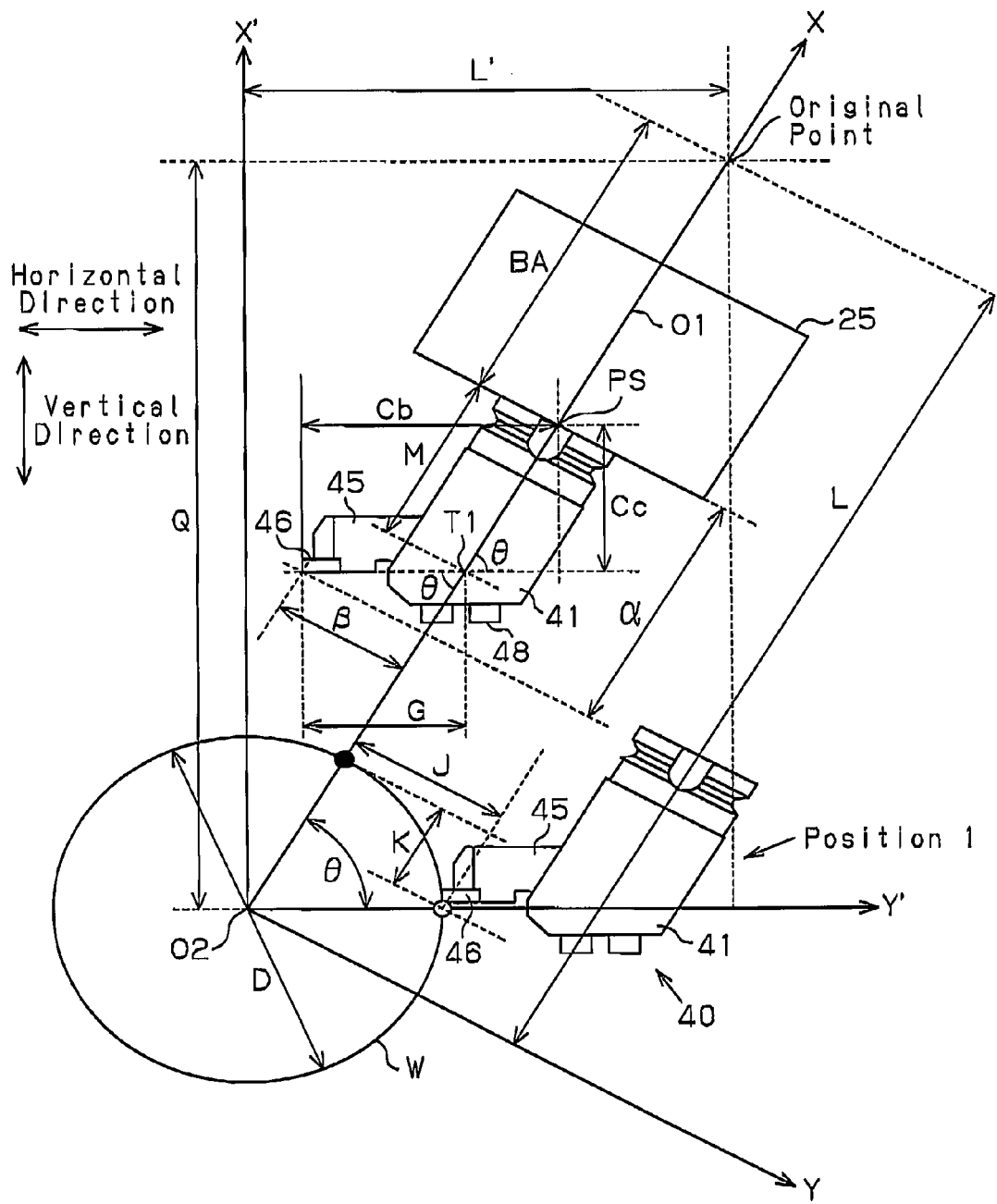
FIG. 7 is a diagram illustrating the difference in the cutting point between the prior art and the present embodiment.

The third tool length Cc is the amount of offset by which the blade of the turning tip 46 is offset in the vertical direction from the reference point PS. The third tool length Cc is the distance between the above described reference point PS and the blade of the turning tip 46 in the vertical direction. As shown in FIG. 7, the location of this reference point relative to the center of rotation of the workpiece W, that is to say, the original point within the machine, is already known. According to the prior art, the first tool length Ca, the second tool length Cb and the third tool length Cc are registered, and they are not used at the time when a workpiece is processed.

An example where the main control section 110 carries out an internal arithmetic processing using the location of the blade stored in the buffer memory 140 (storage means), that is to say, the second tool length Cb, the third tool length Cc and the predetermined angle θ, is described below. This example is an example where the second tool length Cb, the third tool length Cc and the predetermined angle θ are used to gain the tool length α and β in the direction of the X axis and the Y axis, which are used in general tool length correcting functions.

The following formulas are derived from FIG. 7:

$$M \times \sin = Cc \quad (6)$$

$$M \times \cos\theta + G = Cb \quad (7)$$

$$G \times \cos\theta + M = \alpha \quad (8)$$

M: the distance between the point T1 at which the horizontal plane which passes through the blade of the turning tip 46 crosses the axis O1 of the tool spindle 25 and the reference point PS along the axis O1

G: the distance between the blade of the turning tip 46 and the above described point T1

Here, the following formula is derived from formula (6):

$$M = Cc/(\sin\theta) \quad (9)$$

Formula (9) is substituted into formula (7) in order to obtain:

$$(\cos\theta/\sin) \times Cc + G = Cb \quad (10)$$

Accordingly, $$G = Cb - (\cos\theta/\sin) \times Cc \quad (11)$$

Formula (9) and formula (11) are substituted into formula (8) in order to obtain:

$$\alpha = (Cb - (\cos\theta/\sin) \times Cc) \times \cos\theta + Cc/\sin \quad (12)$$

As shown in formula (12), the tool length α that has been used according to the prior art in the combined lathe apparatus 20 having the X axis and the Y axis in the mechanical coordinate can be represented using the second tool length Cb, the third tool length Cc, and the predetermined angle θ. The tool length α corresponds to the fifth tool length. The tool length α is the amount of offset by which the blade of the turning tip is offset along the X axis from the reference point PS.

In addition, the following formula is derived from FIG. 7:

$$\beta = G \times \sin\theta$$

Formula (11) is substituted into the above formula in order to obtain:

$$\beta = (Cb - (\cos\theta/\sin\theta) \times Cc)) \times \sin\theta \quad (13)$$

In the case of the prior art, the following formulas are derived when assuming that the distance in which the blade moves along the X axis is the diameter D of the workpiece W as the program instructs.

$$\text{Amount of movement in } X \text{ direction} = L - BA - \alpha - (D/2) \quad (14)$$

$$\text{Amount of movement in } Y \text{ direction} = 0 \quad (15)$$

In the present embodiment, it is required to position the tool in position 1 in FIG. 7 in order to adjust the core height. In addition, in order to carry out a cutting process in the Y'-Z plane, the tool is positioned in accordance with the following formulas (16) and (17) using α and β, which are obtained from formulas (12) and (13). The control apparatus 100 operates in accordance with formulas (12), (13), (16) and (17).

$$\text{Amount of movement in } X \text{ direction (horizontal turning)} = L - BA - \alpha - (D/2) + K = L - BA - \alpha - (D/2) + ((D/2) - (D/2) \times \cos\theta) \quad (16)$$

$$\text{Amount of movement in } Y \text{ direction (horizontal turning)} = \beta + J = \beta + (D/2) \times \sin\theta \quad (17)$$

L and BA are mechanical parameters and have already known values which are set when the machine manufacturer assembles the machine.

L: the distance between the original point of machine and the center of rotation of the workpiece W (axis O2)

BA: the distance between the original point of machine when the tool spindle 25 returns to the original point and the end surface of the tool spindle 25 (reference point PS)

D: the diameter of the workpiece which is instructed by the program

Although the description is omitted, the first tool length Ca is referred to in the same manner as in the conventional tool length correction when the tool moves along the Z axis. As can be seen from the above described formulas, the operator may simply input the diameter of the workpiece W as in the prior art. That is to say, when the first tool length Ca, the second tool length Cb, the third tool length Cc and the predetermined angle θ are used in the process program for conventional two-axis lathing that has been programmed such that the blade moves along the X axis and the Z axis, the amounts of movement of the blade along the X axis, the Y axis and the Z axis can be gained.

The blade position registering apparatus 60 according to the second embodiment provides a blade position registering apparatus which can be used in the combined lathe apparatus according to the first embodiment having an ATC 30. In the case where high precision in processing is not required, in the case where the workpiece W is short or in the case where effects of the workpiece due to its own weight are small, the conventional turning process may be adopted.

In the case where the conventional turning process is carried out, the operator inputs a tool for X-Z plane turning as the tool type when registering the tool name "TOOL-A," "TOOL-B" or the like on the tool registering screen 171 shown in FIG. 19. The "TOOL-A," "TOOL-B" or the like for X-Z plane turning correspond to the tool for the second axis-first axis plane turning.

In addition, as shown in FIG. 20(A), the main control section 110 displays the tool length entry field 173 for a tool for X-Z plane turning on the display screen in the display portion 170. The operator operates the control panel 160 so that the Z axis offset and the X axis offset are respectively inputted into the fields corresponding to the "TOOL-A" and "TOOL-B" in the tool length entry field 173. The main control section 110 stores the inputted tool length in the buffer memory 140. In the present embodiment, the Z axis offset corresponds to the tool length B, which is the fourth tool length, and the X axis offset corresponds to the tool length α, which is the fifth tool length. In addition, the control panel 160 corresponds to the input means for inputting the fourth tool length and the fifth tool length, and the buffer memory 140 corresponds to the means for storing the inputted tool lengths.

This combined lathe apparatus having a blade position registering apparatus selects a tool for X-Z plane turning as the tool to be used which is designated in the process program and inputs the tool length B (fourth tool length) and the tool length α (fifth tool length) of the turning tool attached to the conventional turning process tool holder, and thus, can carry out the same turning process as in the prior art.

As described above, the control apparatus 100 automatically determines whether the tool name that has been programmed so that the blade moves along the X axis and the Z axis should be used as it is from among the tool names that have been designated as tools used in the process program in accordance with the tool type that has been inputted on the tool registering screen 171, and thus, tool movement control should be carried out along the X axis and the Z axis or the first tool length Ca, the second tool length Cb, the third tool length Cc and the predetermined angle θ should be used so that tool movement control is carried out along the X axis, the Y axis and the Z axis.

Third Embodiment

Next, the blade position detecting apparatus 50 which is used in the above described combined lathe apparatus 20 is described with reference to FIGS. 1 and 8 to 10.

A support portion 53 is provided in the vicinity of the workpiece spindle 26a, above a bed 21. An arm 51 which extends along the Z axis is supported by the support portion 53 in such a manner as to be rotatable. A detection portion main body 52 which is used for a combined lathe apparatus 20 is provided at a distal end of the arm 51. The detection portion main body 52 is placed in the vicinity of the axis O2 of the workpiece spindle 26a. The support portion 53 is omitted in FIG. 8. The arm 51 is rotated by the support portion 53 when a turning process is carried out on the workpiece W, so that the detection portion main body 52 stands by outside the region where the main body is to be processed.

Figure 8:
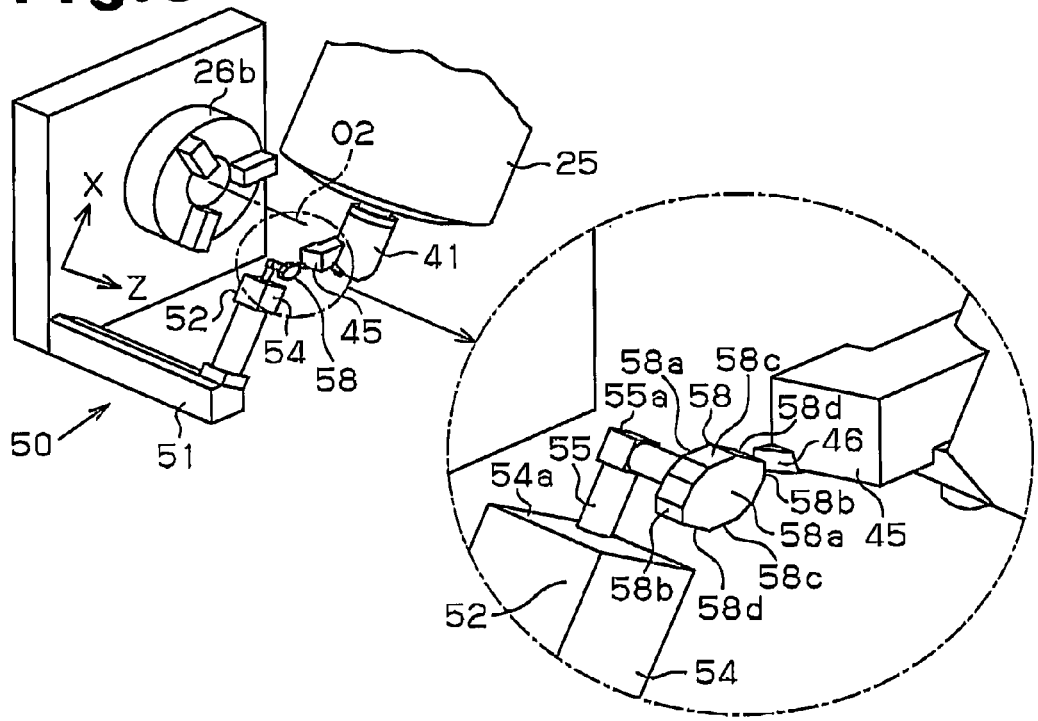
FIG. 8 is a perspective view showing a blade position detecting apparatus according to a third embodiment of the present invention.
Figure 9:
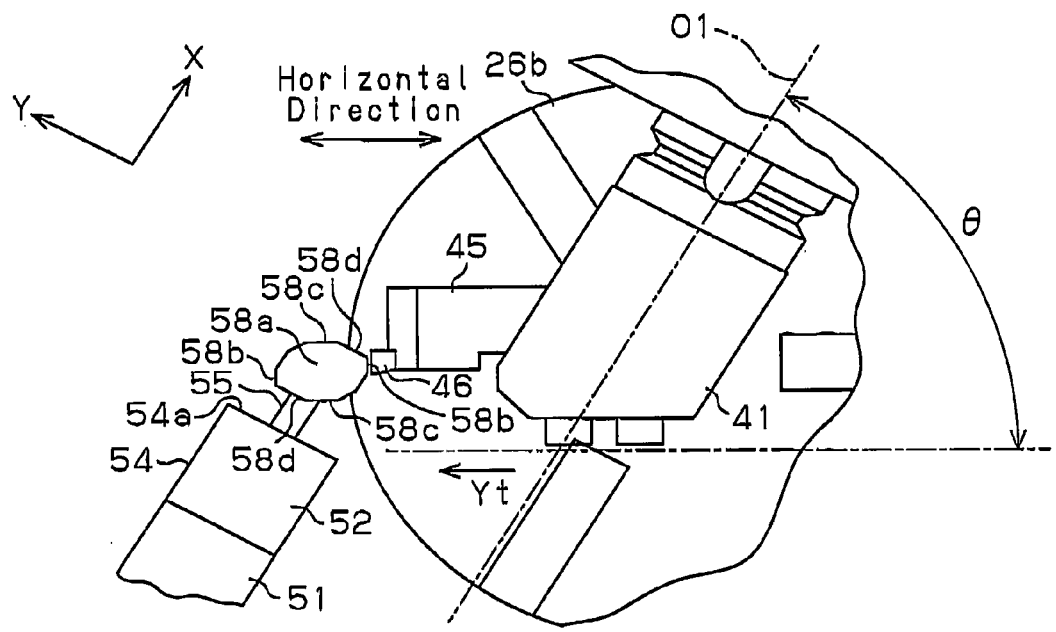
FIG. 9 is an enlarged side view showing a portion of the blade position detecting apparatus.
Figure 10:
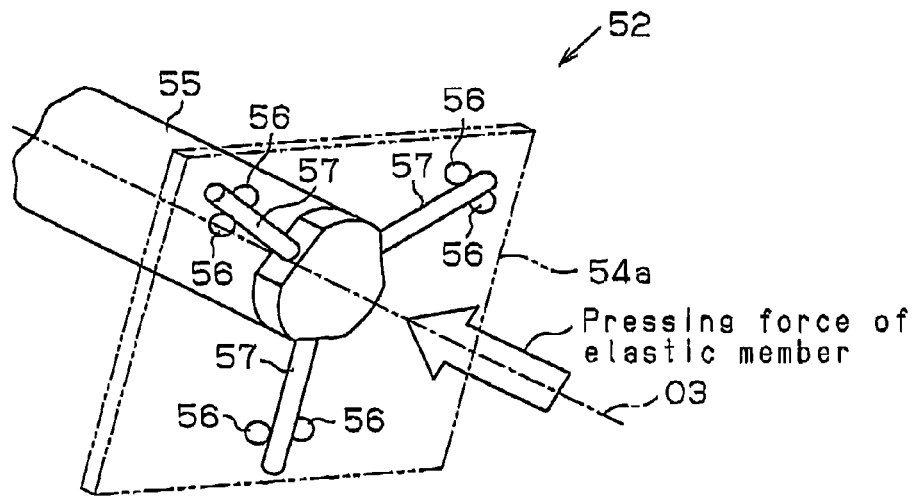
FIG. 10 is an enlarged perspective view showing a portion of a needle member.

A main body case 54 is attached to the arm 51. A needle member 55 is supported within the main body case 54 in such a manner as to be reciprocable against the pressing force of an elastic member (not shown). In addition, as shown in FIG. 10, the needle member 55 is supported in such a manner as not to be rotatable around its axis O3. As shown in FIGS. 8 and 9, a distal end of the needle member 55 protrudes from the upper surface of the main body case 54. Three pairs of connection terminals 56 are placed with equal angular intervals around the axis O3 of the needle member 55 on the inner surface of the upper wall 54a of the main body case 54. As shown in FIG. 10, three contactors 57 which always make contact with the three pairs of connection terminals 56 protrude from the end portion of the needle member 55.

When the needle member 55 reciprocates, one of the three pairs of connection terminals 56 moves away from the contactors 57, so that the electrical connection between the pairs of connection terminals 56 and the contactors 57 is broken. The three pairs of connection terminals 56 are connected to each other in series, and therefore, when one of the three pairs of connection terminals 56 is electrically disconnected, an OFF detection signal is outputted to the control apparatus 100. A detection body 58 is supported by the distal end of the needle member 55 via a bent portion 55a in L shape. As shown in FIG. 8, the detection body 58 is formed in polyhedron block form. The detection body 58 is provided with a first detection surface 58a, a second detection surface 58b, a third detection surface 58c, and a fourth detection surface 58d.

As shown in FIGS. 8 and 9, the first detection surface 58a is a plane perpendicular to the axis O2 of the workpiece spindle 26a. The detection body 58 is provided with a pair of first detection surfaces 58a which are aligned along the Z axis. The pair of first detection surfaces 58a can make contact with the blade of the turning tip 46 when the tool is moved along the axis O2 of the workpiece spindle 26a. The first detection surfaces 58a measure the first tool length Ca.

When the turning tip 46 moves along the +Z axis or −Z axis so as to make contact with a first detection surface 58a, a detection signal is outputted to the control apparatus 100 from the detection portion main body 52. The Z axis drive motor Mz stops rotating at the same time as the output of this detection signal. At this time, the amount of movement of the tool from the initial location Z0, not shown, is counted in accordance with the number of revolutions of the motor, so that the coordinates of the location where the tool stops along the Z axis is calculated. The control apparatus 100 calculates the first tool length Ca on the basis of the calculated location at the coordinates. The control apparatus 100 is provided with a counter for counting the amount of movement of the tool.

When the turning tool attached to conventional tool holders moves, the first detection surface 58a can make contact with the blade of the turning tip. That is to say, the first detection surface 58a can be used to detect the tool length B of the turning tool attached to conventional tool holders.

The second detection surface 58b is a plane perpendicular to the horizontal line Yt. The detection body 58 is provided with a pair of second detection surfaces 58b which are arranged so as to face each other. The pair of second detection surfaces 58b can make contact with the blade of the turning tip 46 when the tool is moved along the horizontal line Yt. The second detection surfaces 58b measure the second tool length Cb.

When the turning tip 46 moves along the horizontal line Yt and makes contact with a second detection surface 58b, a detection signal is outputted to the control apparatus 100 from the detection portion main body 52. The Yt axis drive motor Myt stops rotating at the same time as the output of this detection signal. At this time, the amount of movement of the tool from the initial location Yt0, not shown, is counted in accordance with the number of rotations of the motor, so that the coordinates of the location where the tool stops along the Yt axis can be calculated. The control apparatus 100 calculates the second tool length Cb on the basis of the calculated location at the coordinates.

Third detection surfaces 58c are horizontal planes perpendicular to a vertical line. The detection body 58 is provided with a pair of third detection surfaces 58c which are arranged in such a manner as to face each other. When the tool is moved along a vertical line, the pair of third detection surfaces 58c can make contact with the blade of the turning tip 46. The third detection surfaces 58c measure the third tool length Cc.

When the turning tip 46 moves along a vertical line and makes contact with a third detection surface 58c, a detection signal is outputted to the control apparatus 100 from the detection portion main body 52. The X axis drive motor Mx and the Yt axis drive motor Myt both stop rotating at the same time as the output of this detection signal. At this time, the amount of movement of the tool from the initial location X0 and the initial location Yt0 is counted in accordance with the number of rotations of the motors, so that, the coordinates of the location where the tool stops is calculated. The control apparatus 100 calculates the third tool length Cc on the basis of the calculated location at the coordinates.

Fourth detection surfaces 58d are planes perpendicular to the X axis. The detection body 58 is provided with a pair of fourth detection surfaces 58d which are arranged in such a manner as to face each other. When the turning tool attached to conventional tool holders moves along the X axis, the pair of fourth detection surfaces 58d can make contact with the blade of the turning tip. That is to say, the fourth detection surfaces 58d are used to measure the tool length a of the turning tool attached to conventional tool holders.

When the turning tip 46 moves along the X axis and makes contact with a fourth detection surface 58d, a detection signal is outputted to the control apparatus 100 from the detection portion main body 52. The X axis drive motor Mx stops rotating at the same time as the output of this detection signal. At this time, the amount of movement of the tool from the initial location X0 is counted in accordance with the number of rotations of the motor, so that the coordinates of the location where the tool stops can be calculated. The control apparatus 100 calculates the tool length α on the basis of the calculated location at the coordinates.

The detection body 58 is provided with a pair of first detection surfaces 58a, a pair of second detection surfaces 58b, a pair of third detection surfaces 58c, and a pair of fourth detection surfaces 58d. As a result, the location of the blade of the tool can be detected in accordance with the position and form of the tool attached to the tool holder.

In the blade position detecting apparatus 50 according to the present embodiment, the detection body 58 is provided with second detection surfaces 58b and third detection surfaces 58c for measuring the second tool length Cb and the third tool length Cc. Therefore, the second tool length Cb and the third tool length Cc can be measured. In addition, the detection body 58 is also provided with first detection surfaces 58a and fourth detection surfaces 58d. Therefore, the first tool length Ca, that is to say, the tool length B of the turning tool attached to conventional tool holders and the conventional tool length α can also be measured.

The present embodiments may also be implemented as follows.

Although the first embodiment of the present invention is implemented as the combined lathe apparatus 20 as shown in FIG. 12(A), the first embodiment may be implemented as the combined lathe apparatus as shown in FIG. 12(B). In this case, the carriage 23 is moved in a direction including the Y axis component, in order to move the tool attached to the tool spindle 25 along the horizontal line Yt, and at the same time, the tool headstock 24 is moved along the X axis. In addition, the combined lathe apparatus is provided with a control apparatus 100 which carries out a turning process on the workpiece W which is attached to the workpiece spindle 26a. In this case, the tool moves by Y cos θ/sin θ along the X axis, and by Yt sin θ along the Y axis. As a result, the carriage 23 moves along the horizontal line Yt.

In addition, the present invention may be embodied as the combined lathe apparatus shown in FIG. 12(C). This case corresponds to a case where θ is 90 degrees and the Y axis coincides with the horizontal line Yt.

The invention claimed is:

1. A blade position registering apparatus for registering a position of a blade of a turning process tool which is provided in a combined lathe apparatus, wherein the combined lathe apparatus comprises:
   a workpiece spindle on which a workpiece is mounted;
   a tool spindle to which a turning process tool for carrying out a turning process on the workpiece is removably attached;
   automatic tool replacing means for taking out a specific turning process tool from among a plurality of turning process tools and replacing the turning process tool attached to the tool spindle with the specific turning process tool;
   a tool headstock which is movable along a second axis which is perpendicular to a first axis, which corresponds with a longitudinal axis of the workpiece spindle, and the second axis positioned a predetermined angle with a horizontal plane, the tool headstock also having the tool spindle;
   a movable body which supports the tool headstock;
   a control means for controlling movement of the movable body;
   wherein the movable body is movable in a direction including a component of a third axis, which is perpendicular to the first axis, wherein the component of the third axis is parallel to the horizontal plane,
   wherein the tool spindle can be controlled to be rotated or held without being rotated, and
   wherein the control means moves a cutting point of the turning process tool attached to the tool spindle along a horizontal line, which is perpendicular to the first axis, by moving the movable body in a direction along the component of the third axis during a turning process on the workpiece attached to the workpiece spindle,
   wherein a reference point is provided on the axis of the tool spindle;
   the blade position registering apparatus comprising:
   a blade position inputting means for inputting 1) a first tool length, which is an amount of offset by which the blade of the turning process tool is offset from the reference point along the first axis, 2) a second tool length which is an amount of offset by which the blade of the turning process tool is offset from the reference point along a second horizontal line, which is perpendicular to the first axis, 3) a third tool length, which is an amount of offset by which the blade of the turning process tool is offset from the reference point along a vertical line, 4) a fourth tool length, which is an amount of offset by which a blade of a second tool that does not cut in the horizontal line for turning in a second axis-first axis plane is offset from the reference point along the first axis, and 5) a fifth tool length, which is an amount of offset by which the blade of the second tool for turning in the second axis-first axis plane is offset from the reference point along the second axis, and a storage means for storing the inputted first tool length, the second tool length, the third tool length, the fourth tool length, and the fifth tool length.

2. A blade position registering apparatus for registering a position of a blade of a turning process tool which is provided in a combined lathe apparatus, wherein the combined lathe apparatus, comprises:

a workpiece spindle on which a workpiece is mounted;

a tool spindle to which a turning process tool for carrying out a turning process on the workpiece is removably attached;

automatic tool replacing means for taking out a specific turning process tool from among a plurality of turning process tools and replacing the turning process tool attached to the tool spindle with the specific turning process tool;

a tool headstock which is movable along a second axis, which is perpendicular to a first axis, and which corresponds with the axis of the workpiece spindle and forms a predetermined angle with a horizontal plane, the tool headstock having the tool spindle;

a movable body which supports the tool headstock; and a control means for controlling movement of the movable body, wherein the movable body is movable along the third axis, wherein the tool spindle can be controlled to be rotated or held without being rotated, wherein the control means moves a cutting point of the turning process tool attached to the tool spindle along a horizontal line, which is perpendicular to the first axis, by moving the movable body along a third axis, which is defined as an axis that is perpendicular to the first axis and the second axis, and simultaneously moving the tool headstock along the second axis, during a turning process on the workpiece attached to the workpiece spindle, and wherein a reference point is provided on the axis of the tool spindle;

the blade position registering apparatus comprising:

a blade position inputting means for inputting 1) a first tool length, which is an amount of offset by which the blade of the turning process tool is offset from the reference point along the first axis, 2) a second tool length, which is an amount of offset by which the blade of the turning process tool is offset from the reference point along a second horizontal line, which is perpendicular to the first axis, 3) a third tool length which is an amount of offset by which the blade of the turning process tool is offset from the reference point along a vertical line, 4) a fourth tool length, which is an amount of offset by which a blade of a second tool that does not cut in the horizontal line for turning in a second axis-first axis plane is offset from the reference point along the first axis, and 5) a fifth tool length which is an amount of offset by which the blade of the second tool for turning in the second axis-first axis plane is offset from the reference point along the second axis, and a storage means for storing the inputted first tool length, the second tool length, the third tool length, the fourth tool length, and the fifth tool length.

3. The blade position registering apparatus according to claim 1, wherein the reference point is provided on an intersection of a surface defined by the attachment of the tool spindle to the turning tool holder and the axis of the tool spindle.

4. The blade position registering apparatus according to claim 2, wherein the reference point is provided on an intersection of a surface defined by the attachment of the tool spindle to the turning tool holder and the axis of the tool spindle.

* * * * *